United States Patent [19]
Wright et al.

[11] Patent Number: 5,184,009
[45] Date of Patent: * Feb. 2, 1993

[54] OPTICAL ATTENUATOR MOVEMENT DETECTION SYSTEM

[76] Inventors: Scott M. Wright; Raymond E. Wright, both of 69 Lakewood Dr., Mineral City, Ohio 44656

[*] Notice: The portion of the term of this patent subsequent to Nov. 20, 2007 has been disclaimed.

[21] Appl. No.: 505,563

[22] Filed: Apr. 6, 1990

Related U.S. Application Data

[63] Continuation-in-part of Ser. No. 335,833, Apr. 10, 1989, Pat. No. 4,972,074.

[51] Int. Cl.⁵ .............................................. H01J 5/16
[52] U.S. Cl. ........................ 250/227.11; 250/227.24; 250/221
[58] Field of Search ................ 250/227.11, 227.24, 250/221, 231 R Primary Examiner—David C. Nelms
Assistant Examiner—Que T. Le
Attorney, Agent, or Firm—Oldham, Oldham & Wilson

[57] ABSTRACT

An optical attenuation measurement system is provided for obtaining signals proportional to movement of a system to which it is attached. The measurement system includes a light source positioned within a length of conduit in which the light emitted will produce multiple reflections. A fiber optic cable is slidably disposed within the conduit to transmit the radiation emitted from the light source gathered thereby. The relative displacement of the fiber optic cable to the light source produces a signal as a function of this displacement which is converted into electrical signals by a light detecting element at the opposite end of the cable. The system is particularly useful to form an interactive device for control of a remote intelligent machine, robot or the like. For example, the system may be used on an operator's hand to detect movement of the hand and fingers for controlling a robotic hand which will mimic the operator's hand movements.

22 Claims, 11 Drawing Sheets

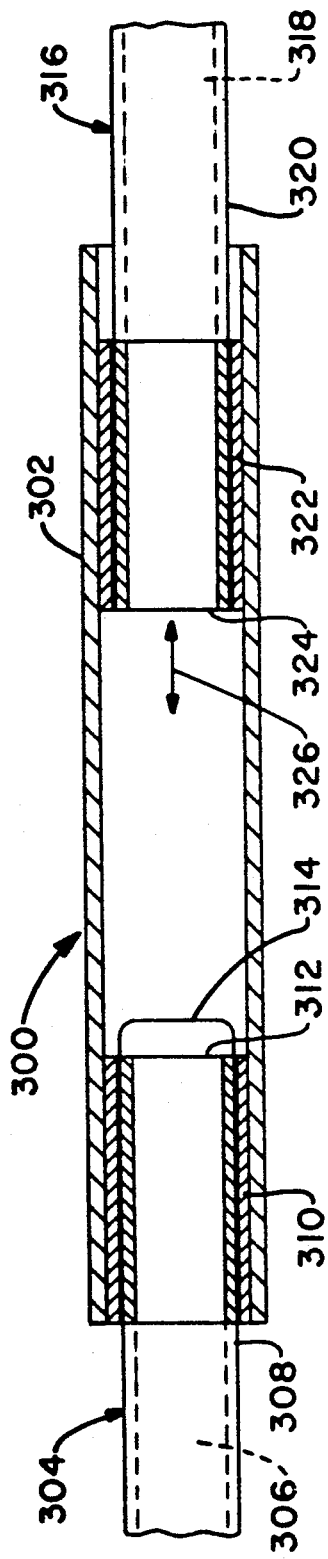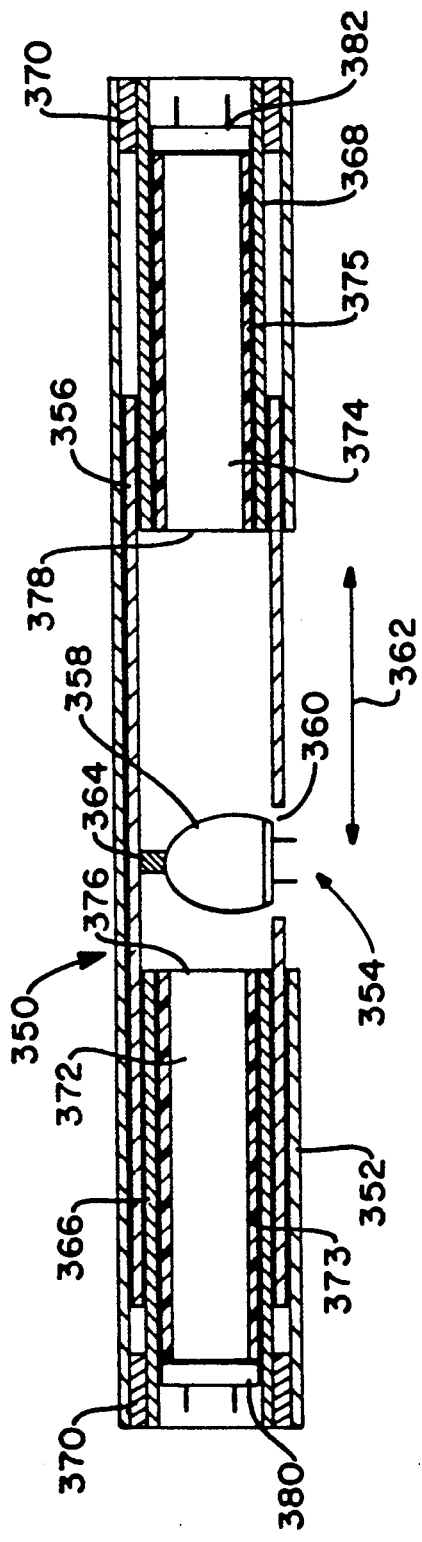

OPTICAL ATTENUATOR MOVEMENT DETECTION SYSTEM

This is a continuation-in-part of copending application Ser. No. 07/335,833 filed on Apr. 10, 1989, now U.S. Pat. No. 4,972,074.

BACKGROUND OF THE INVENTION

This invention relates generally to a measurement and control system utilizing optical attenuation to detect movement of a system to which it is attached. More specifically, the invention relates to an optical attenuation system and components thereof which will generate signals proportional to the movement of an article to which the system is attached. As an example, movement of a human hand may be detected so as to provide an interaction device which will generate signals proportional to hand and finger movements for control of a multi-degree-of-freedom robotic hand or the like.

Optical measurement systems are known and have been utilized in a wide variety of applications. Optical systems have been utilized particularly in the telecommunications industry, wherein an optical fiber is utilized as a communications link with a light signal being modulated to represent information which can then be detected and demodulated at the opposite end of the fiber for use. Optical systems have the unique ability to be introduced into hostile environments, particularly those having strong electromagnetic or electrostatic interference which may affect wiring, addressing, and signal processing aspects of a sensing, measuring or processing system. The optical system will not be adversely affected by such interference which may generate significant electric noise levels in electrical systems. In general, an optical system will include a source of light which may be introduced into an optical fiber and subsequently carried to a light sensor for converting the light signal into an electrical signal for use. The optical fibers utilized in such a system comprise a transparent core of suitable glass or plastic material which is carried within a relatively thin cylindrical cladding wherein the cladding has an index of refraction which is less than the refractive index of the core material. When a light signal is introduced into the optical fiber, the core material functions as a wave guide and will transmit or propagate the light signal with relatively small transmission losses, thereby enabling its effective use. The fiber optic cable will function reliably without undue attenuation of the light signals even if gradual turns or bends are introduced into the fiber.

It has been found in the prior art that relatively short bends in an optical fiber may significantly attenuate the light signals transmitted therethrough to enable use of an optical fiber in various measurement systems. Fiber optic systems have been developed for measuring mechanical motion or remote force measurements by introducing relatively short bends or what has been labeled the microbend effect inherent in fiber optic cables. The microbends introduced into a fiber optic cable result in the attenuation of the propagated light signal by scattering a portion of the signal from the fiber core to the cladding and/or to the surrounding environment.

Optical fiber microbending has been utilized to detract a portion of the light signal from a fiber optic cable or to input additional light signals into the fiber without damaging the fiber. One such system is shown in U.S. Pat. No. 4,253,727 showing a microbend coupler utilizing this phenomena. Alternatively, other uses for the concept of optical fiber micro bending are known. The technique may be utilized to measure displacement or force which would result in deformation of an optical fiber causing further attenuation which could be quantified to yield these measurements. One example of an optical sensor to monitor vibration or mechanical motion of equipment to which the sensor is attached is shown in U.S. Pat. No. 4,408,495. This phenomenon has also been utilized to determine the forces acting along a structure such as an oil or gas pipeline as shown in U.S. Pat. No. 4,477,725.

In these examples, the attenuation of the transmitted optical signal is determinative of the physical variable to be measured and must be of high sensitivity and include relatively complex signal processing means to measure fine variations in these variables. On the other hand, other optical systems may be responsive to alternative optical characteristics such as phase or polarization angle of the light source being transmitted through the fiber optic cable. A deformation sensor which may utilize other optical characteristics is shown in U.S. Pat. No. 4,420,251. It is recognized in such a system that the incident optical energy must be polarized by means of additional structure thereby adding complexity to the system.

Optical systems have also been utilized in other measurement systems such as an optical fiber based spectrometer utilized to determine the presence or absence of elements or the like in a sample or process being analyzed. The spectrometer measures the spectral radiance of light signals carried over a plurality of optical fibers at a distance from the sample being analyzed to avoid unwanted interference with measuring and processing apparatus. The spectrometer includes an optical attenuator which includes a plurality of eccentrically located apertures, the positions of which are variable. By suitably positioning the apertures on a fixed plane perpendicular to the emitted light rays, the desired amount of attenuation of light input from the optical fibers may be controlled by the misalignment of the optical fiber ends.

In yet another system as shown in U.S. Pat. No. 4,733,068, a fiber optic sensor array is utilized to form a tactile sensor utilized in manipulation activities for intelligent machines and robotics. The tactile sensor as described in this patent utilizes an array of transmitting and detecting optical fibers optically coupled to one another and sandwiched between a pliable spacer arrangement. As the supporting structure is deformed by an external force, the amount of light coupled into the detecting fiber from the transmitting fiber will vary according to the deformation. The changes in the received signals can then by processed to yield an indication of the deformation and thus the amount of force applied to the supporting structure. Control signals may be developed from this system and utilized as feedback so as to give an indication of the force at a remote location which may be especially useful in robotic applications.

It can thus be seen that optical systems have been utilized increasingly for various functions and provide an effective and accurate means by which physical variables may be measured. More recently, there has been found a need for interactive devices to facilitate communication between a user and a remote device such as an intelligent machine or robot. As robots become more of a integral portion of society, there is an increasing need for an effective interface between the user and the robot for control and manipulation of the robotic controls. For example, there have been developed electronic sensors which will register the head position and orientation of a user's head. Signals are developed to be interfaced with a remote robot to manipulate a robots camera eyes or the like in the same direction. Similarly, other interactive devices have been developed to interface with and control robotic functions such as a DataGlove developed by VPL Research, Inc., which translates hand and finger movements into electrical signals to control a remote robot. Such an interaction device enables the precision, control and agility of the human hand to be translated into robotic movements and manipulations enabling extremely effective control thereover. The DataGlove utilizes fiber optic cables sandwiched between two layers of cloth and formed into a glove which can be worn on the users hand. The fiber optic cables are run the length of each finger and thumb and doubled back upon themselves to be anchored at both ends to an interface board located in the base of the glove. Each fiber optic cable includes a light-emitting diode at one end and a phototransistor at the other.

In this system, the fiber optic cables are treated such that light will escape upon flexion movements of the hand of the user. Treating the fiber optic cables in this manner results in attenuation of the transmitted light signals. Alternatively, the treatment may also cause fatigue, deformation and eventual breakage. The phototransistor of the system will convert the light signals which it receives into electrical signals which can subsequently be input to a processing and control apparatus which will control the robotic movements. It should be recognized that the generation of signals proportional to the relatively complex movements of the human hand would enable complex maneuvers and manipulations of robotic apparatus to be carried out in both an easy and effective manner. It should also be recognized that such as system could be incorporated to include and take advantage of other human motions. This system requires complicated processing circuitry and is very costly to manufacture. Treating of the fiber optic cables may also result in reduced ability to form a repeatable and reliable system.

The translation of movements of the human hand have also been accomplished by a mechanical linkage device known as the Sarcose Hand Master developed by the A. D. Little Company. In this assembly, a mechanical linkage is associated with each finger and thumb on a human hand and includes electronic motion sensors which will transmit finger and thumb position information to be processed and utilized by a control system. The system may transduce up to sixteen joint angular positions and may also measure flexion and abduction or adduction. The electronic motion sensors require precise calibration as well as relatively complex processing or transformation and storage of the developed signals. It should be recognized that any mechanical design will inherently include limitations based upon the user and is somewhat cumbersome. Similarly, a mechanical design is subject to limited life and imprecise tuning and repetition of the system.

SUMMARY OF THE INVENTION

From the foregoing, it can be seen that there is a great need for an interactive device which is simple to construct and use and which does not require extensive or complex processing systems to produce control signals based upon an operators physical movements. Ideally, an interactive device for use with an interactive robotics system requires real-time control which is based upon complex maneuvers of an operators physiology, such as hand or finger movements. The control system must record the complex hand and finger movements and transfer these movements to a robotic hand or other intelligent machine such that the operator finger movements are mimicked in real-time.

The present invention provides a control system which is particularly useful in sensing human finger movements or the like used to control a multi-degree-of-freedom robotic hand which will mimic these movements in grasping and manipulative tasks. The invention in its various embodiments is also useful in a variety of other applications to provide measurements or control capabilities. The control system utilizes an optical attenuator to overcome problems inherent in mechanical systems which may be cumbersome as well as temperamental due to an appreciable amount of mechanical resistance inherent in such systems. The optical attenuator comprises a light source positioned relative to an input end of a fiber optic cable for directing light to the fiber optic cable. The light source is positioned within a length of tubing or conduit in the device or at a remote location therefrom wherein another fiber optic cable will transmit the light thereto. The conduit may also house an input end of a fiber optic cable which is slidably positioned therein. The tubing or conduit in which the light source or fiber optic cable acting as a functional light source is positioned is preferably constructed of a material which will effectively reflect incident light rays from the light source. The reflections of the light inside the length of tubing play an important role in keeping the response linear across a range of relative movement of the input end of the fiber optic cable from the light source. The relative displacement of the input end of the fiber optic cable from the light source or functional light source through a gap formed therebetween will act to attenuate the signals transmitted to the fiber optic cable thereby detecting relative movement therebetween and indicating the amount of such movement. In this system it is important that the relative movement of the fiber optic cable to the source of light be accurately determined over a wide range of movement. The intensity of the light source or the physical properties of the fiber optic cable may be modified to effectively scatter or diffuse the light generated by the light source to linearize the system during displacement. Also, the tubing or conduit can be treated to yield desired reflective properties so as to linearize the output of the device even at very short relative distances between the light source and fiber optic cable.

The output end of the fiber optic cable may then be coupled to a light detecting element sensitive to the wavelength of the light source. The light detecting means will thus determine the variance in light intensity transmitted through the fiber optic cable as a function of displacement of the input end of the cable relative to the light source. The light detecting means will generate signals proportional to the amount of light incident upon it which may subsequently be used to control a remote system as desired or in other various applications.

It should be recognized that the particular light source and light detecting means may be modified over a broad range of devices to generate desired control signals which are proportional to and a function of the motion detected or of the relative displacement therebetween using appropriate receiving circuitry.

It is therefore a main object of the invention to provide a system utilizing an optical attenuator to generate control signals proportional to detected movement or other variables utilizing the optical control system.

It is a further object of the invention to provide a movement detection system which may act as an active device for use in generating real-time control signals proportional to the detected movement and translating such movement to control an intelligent machine, robot or the like. The movement detection system may also be utilized as a device to generate feedback based upon the detected movement for monitoring or measuring such movement in a large variety of applications.

Another object of the invention is to provide a linear movement detection system which is extremely accurate and rugged and adaptable to many applications. This embodiment is formed as an enclosed system having light source and detector, wherein the components are spring biased relative to each other.

Another object of the invention is to provide an in-line optical attenuator wherein both light source and detector are provided at remote locations from the device. In this embodiment, light is transmitted to the attenuator via a length of fiber optic cable wherein the exit end of the cable acts as a functional equivalent to the light source.

A further object of the invention is to provide an optical potentiometer wherein a light source is movably positioned between two light detecting means. The relative position of the light source to the detectors will generate proportional electrical signals forming the function equivalent of a conventional resistive potentiometer.

It is yet another object of the invention to provide a system which is both rugged and dependable and which is simple in its operation and construction. The control system is also uniquely designed to be extremely repeatable and accurate. The system provides a compact and lightweight system which may be used in remote and hostile environments.

It is still another object of the invention to provide a movement detection system which can be utilized in a large variety of situations and which can detect linear or rotational movement of a body or assembly to which it is attached. The system will generate control signals proportional to a detected movement which may be linear or intentionally shaped by means of interface circuitry and the type of detection means utilized in the system.

A further object of the invention is to provide electrical signals which can be processed by control circuitry to yield either analog or digital control signals.

Another object of the invention is to intentionally introduce controlled non-linearities in the waveguide to counter non-linearities inherent in the interface electronic circuitry.

Another object of the invention is to provide a movement detection system for the particular application of detecting human movement such as hand or finger movements to control a remote multi-degree-of-freedom robotic system which will mimic these movements in real-time. The detectable movements include flexion and abduction/adduction wherein a modified system may be utilized for detection of abduction/adduction movements if desired. It is, of course, recognized that the potential of the movement detection system extends well beyond this particular application, and the movement detection system to be hereinafter described is merely one preferred embodiment thereof.

BRIEF DESCRIPTION OF THE DRAWINGS

Other features and advantages of the present invention will become apparent from the following detailed description, taken in conjunction with the accompanying drawings wherein:

FIG. 25 of the present invention for an in-line optical attenuator in an enlarged sectional view taken through the conduit in which a means to transmit and a means to receive light positioned wherein the light emitting and light detecting means of remote from the assembly; and FIG. 26 shows an alternate embodiment of the invention for an optical potentiometer in an enlarged sectional view taken through the conduit in which a light source is movably positioned and light detecting means are arranged relative to the light source to form an adjustable potentiometer.

DETAILED DESCRIPTION OF THE INVENTION

Figure 1:
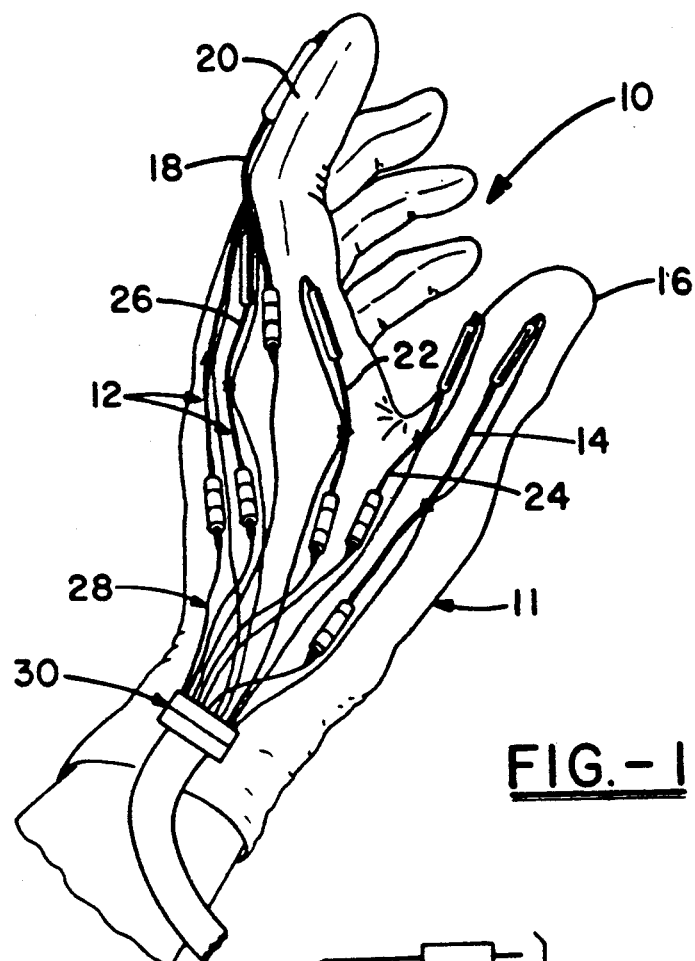
FIG. 1 is a perspective view of the optical movement detection system utilized in a particular application of detecting the movement of the fingers of a hand.

Turning now to the drawings wherein similar reference numerals indicate similar elements, FIG. 1 represents the optical attenuator movement detection system associated with a hand 10 having a control glove 11 to be worn on an operators hand to detect both flexion and abduction/adduction movements of the fingers of the hand. A plurality of detection units 12 are situated in positions relative to the individual fingers and thumb of the hand 10 so as to effectively detect the individual movements thereof. For example, an individual optical sensing device 14 is positioned so as to extend from the base of the hand over the knuckle and substantially to the end of the thumb 16 on an upper portion thereof. In this position, the optical sensing device 14 will measure the flexion movement of the thumb 16 as it rotates into a grasping position. Similarly, a sensing device 18 positioned on the index finger 20 of the hand 10 may extend from a mid portion of the index finger 20 to the end thereof so as to monitor the movement from the outer joint of the index finger 18 to its tip. A second sensing device 22 may then be positioned from the base of the hand over the knuckle of the index finger 20 so as to measure flexion movement about the knuckle separately. It can be seen that a plurality of sensing devices may be utilized to monitor a variety of individual motions of each individual finger of the hand 10. There may also be provided a plurality of sensing devices such as shown at 24 and 26 which may be located on the side areas of the thumb or fingers of the hand to measure abduction/adduction type movements thereof.

Each of the sensing devices 12, which will be more particularly described hereinafter, comprise a light source positioned on the fingers of the hand 10 at the locations where movement is to be detected situated furthest from the base of the hand. The light source is housed in a length of conduit in which a fiber optic waveguide is also slidably positioned. The waveguide extends towards the base of the hand and is coupled to a light detecting element so as to measure the amount of radiation passing through the waveguide from the light source. The electrical signals generated by the light detecting element are then transmitted via wires 28 to an interface unit 30 for subsequent transmission to processing circuitry.

Figure 2:
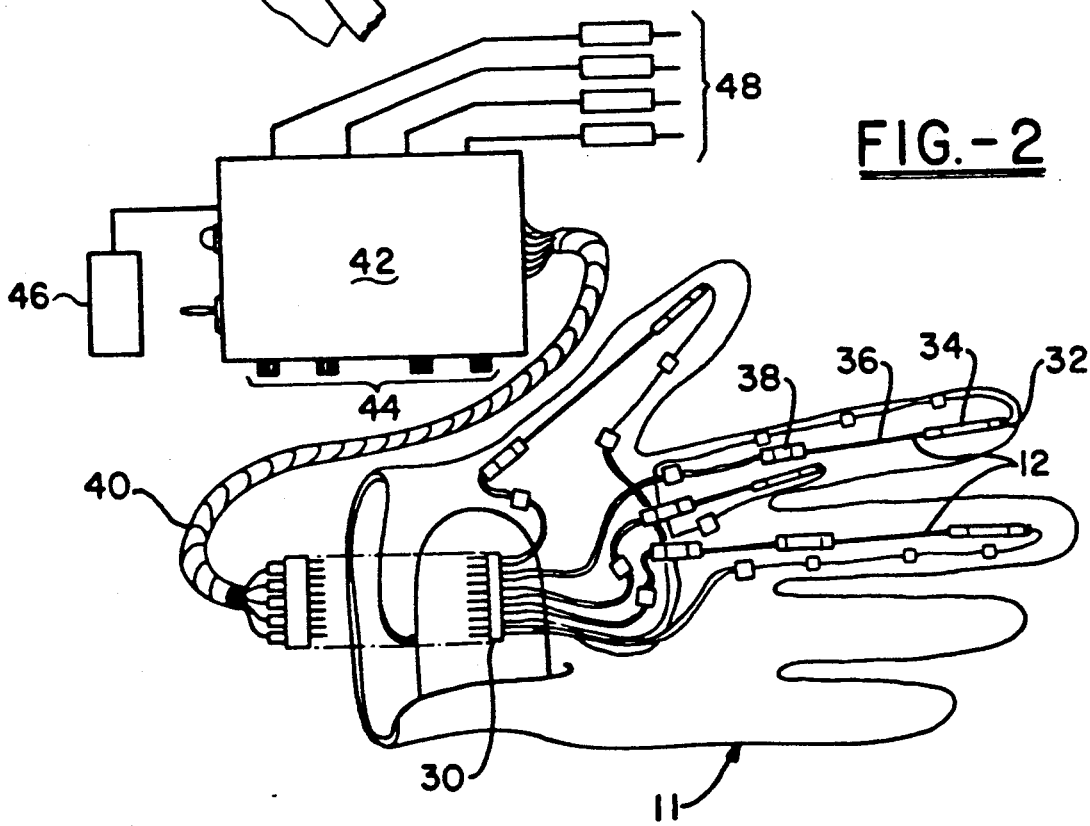
FIG. 2 is a top plan view of the movement detection system associated with a glove to be worn on the hand as shown in FIG. 1, and showing the coupling to an optical control system for processing of the data signals.

As seen in FIG. 2, the control glove 11 including the optical attenuator movement detection system may be provided to detect human finger movements to be used for control of a multi-degree-of-freedom robotic hand which will mimic these movements in real-time to perform grasping and manipulative tasks. The movement detection system includes a plurality of sensing devices 12, the particular number depending upon the type and complexity of the manipulated tasks to be performed. Relative to the embodiment shown in FIG. 1, the glove as shown in FIG. 2 comprises sensing devices 12 which measure only the flexion type movement of a pair of fingers and the thumb of the hand of an operator. It is easily recognized that additional sensing units 12 may be included to measure additional finger and thumb movements and to thereby increase the complexity of resulting robotic movements.

Each of the sensing devices 12 comprises a light source 32 housed in a length of conduit 34 and sealed so as to prevent external light from entering the conduit 34. A length of fiber optic cable 36 slidably engages the conduit 34 to receive the radiation emitted by the light source 32. The radiation received is proportional to the distance from the tip of the cable of the light source. The cable 36 will transmit this radiation to the light detecting means 38. Signals proportional to the magnitude of radiation transferred through the gap between the fiber optic cable 36 from the light source 32 will be transmitted to the interface unit 30 which also supplies power to the individual light sources 32. The developed signals which will be proportional to the movements of the fingers of an operator will be transferred via electric cables 40 to an optical control system 42 which includes adjustments 44 for each of the sensing devices as well as a power source 46 and additional circuitry to be hereinafter described. The optical control system will process the signals received from each of the sensing devices 14 to develop output signals transmitted over outputs 48 to control a remote intelligent machine, robot or the like. The optical attenuator movement detection system used in conjunction with a control glove acts as an active device to generate real-time control signals proportional to detected movements so as to translate these movements to the control of intelligent machines, robots or the like. As an example, this particular application is designed to control a multi-degree-of-freedom robotic hand which may include what amounts to two mechanized fingers and a thumb. To use the hand in an interactive robotic system, the movement detection system affords real-time control which may be substituted for a joystick control of a conventional remote control transmitter assembly. In one known RC transmitter, a pulse modulation system is employed wherein joysticks physically turn 5 K potentiometers for a plurality of channels which in turn control the position of servo-mechanisms associated with the fingers of the robotic hand.

The control glove as described with reference to FIGS. 1 and 2 is utilized to replace joystick control units of the RC transmitter. The resistance characteristics on one-half of the control potentiometers were substituted with the fiber optic control system to provide similar position/resistance relationships to affect control of the robotic hand. The complex movements detected by the movement detection system of the invention enable control of a dexterous robotic hand in a much more effective and complex manner than that enabled by use of joystick control.

Figure 3:
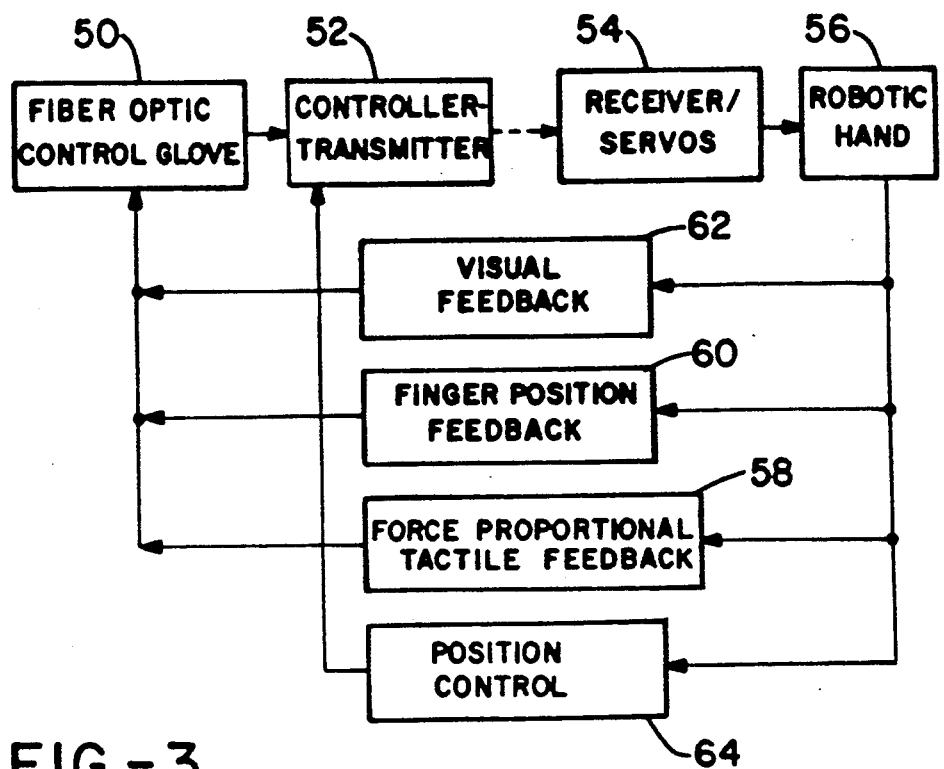
FIG. 3 is a block diagram of one type of system in which the optical attenuator movement detection system may be utilized.

For complete control of the dexterous robotic hand, other systems may be necessary which will be understood with reference to FIG. 3. In this system, the fiber optic control glove will develop signals relative to the motion of an operators hand as previously described in 50. The developed signals will be processed by the optical controller 52 and will take place of a joystick control on a RC transmitter. At a remote location, the transmitted signals proportional to the hand movements of an operator will be received so as to control the servomechanisms associated with a robotic hand at 54 and 56 to affect real-time control thereover. The robotic hand may include force proportional tactile feedback information at 58 from sensors positioned on the robotic hand 56. These feedback signals may be provided to simulate a sense of touch on the finger of the operator at the remote location by transducers placed in the control glove. Additional feedback mechanisms such as finger position feedback 60 as well as visual feedback 62 inherent to the operator will facilitate control of the robotic hand by the operator. Additionally, a position control means 64 may be provided to sense the absolute position and orientation of the operators hand or of the robotic hand for proper control in certain applications. It should be seen that such a system provides an extraordinarily sensitive link between operator and robot with several levels of feedback to effect human-robotic interaction. Applications of such a system include hazardous tasks that require human dexterity and intellect such as the handling of pathogenic or toxic substances, tasks that involve high radiation levels as well as work in hostile environments such as space and deep sea.

Figure 4:
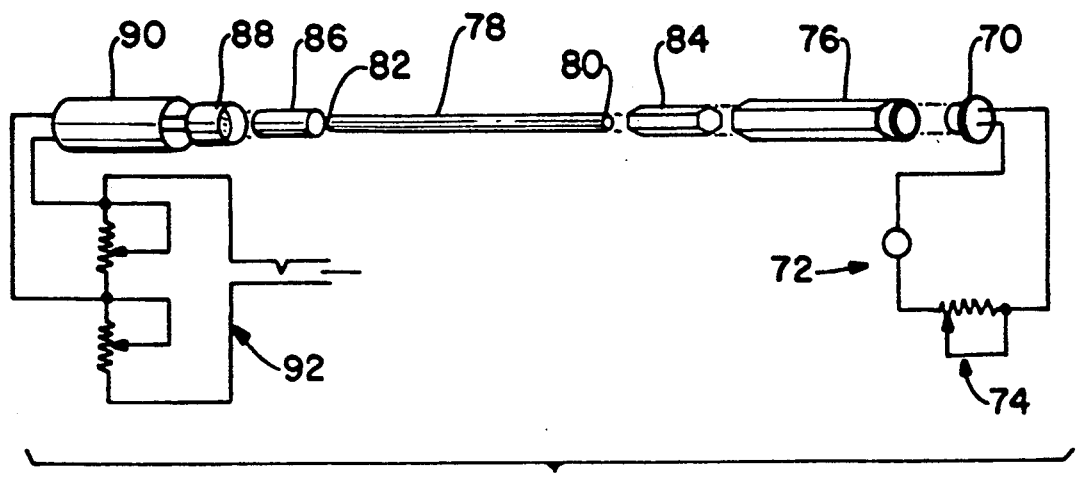
FIG. 4 is an exploded view of the optical attenuation movement detection system showing the individual elements thereof in the preferred embodiment.

Turning now to FIG. 4, the optical attenuator movement detection system is shown more distinctly. The detection system comprises a light source 70 which may be a conventional LED having a predetermined wavelength of emitted light. The LED 70 is driven by a voltage source 72, and may be adjusted to emit the desired intensity by a potentiometer 74. The LED 70 is positioned so as to emit light into a length of tubing or conduit 76 which may be constructed of brass or any other material which will produce reflection of the emitted light from the LED 70 within the conduit 76. The LED 70 is appropriately sealed at the end of the conduit 76 so as to prevent external light from entering the conduit at this location. At the other end of the tube 76 there is provided a fiber optic cable 78 which may be of any desired length having an entrance end 80 and an exit end 82 for transmitting captured radiation. At the entrance end 80 of the fiber optic cable 78 there is positioned a short length of tubing or conduit 84 placed around the external surface of the fiber optic cable 78. The conduit portion 84 is designed to be slidably engaged within the length of conduit 76 to enable relative movement between the fiber optic cable 78 to the LED 70 in the length of conduit 76. The conduit portion 84 slides easily within the conduit 76 but is also closely fit to prevent external light from entering the conduit 76. The portion 84 also acts to positively align the fiber optic cable 78 with the LED 70 throughout relative movement. It should be recognized that if desired the conduit portion 84 may also be provided with a sealing means to totally prevent external light and atmosphere from entering the conduit 76, but should always remain slidable therein. There may also be provided a flexible sleeve which will encompass the entire system to prevent light or atmosphere from contaminating it.

In a preferred embodiment, the length of conduit 76 has a hexagonal cross-section along with conduit section 84 which has a similar but smaller cross-section so as to be slidably engaged within the length of conduit 76. The hexagonal cross-section enables positive alignment between the light source 70 which may be an incandescent source, an LED, or any other appropriate light source, and entrance end 80 of the fiber optic cable 78 throughout relative movement therebetween. As previously stated, a suitable material for the conduit 76 is a brass hexagonal tubing which is easy to machine, wears reasonably well and is inexpensive, although other cross-sectional configurations are certainly usable and may be desirable for certain applications. The hexagonal cross-section minimizes twist between components in the system and thereby maintains consistent alignment so as to maintain the optical characteristics of the system uniform. A problem has been found with the brass tubing or other tubing which may be usable with the system in that the inner surface thereof produces inconsistent reflective properties which may adversely effect the optical characteristics thereof. For a brass tubing, the hexagonal cross-section is generally produced from a seamless round-tube stock which has been forced through a set of dies forming the hexagonal shape. While this process maintains rigid dimensional standards, the die forming process does little to impart the desired optical qualities to the material.

Figure 9:
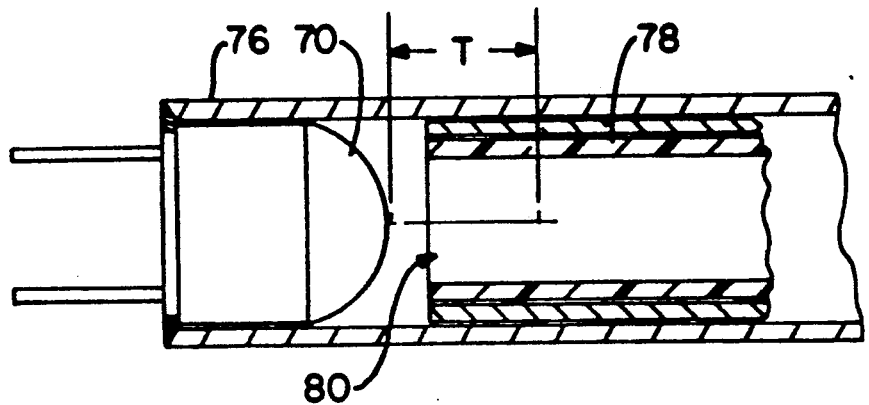
FIG. 9 is an enlarged sectional view taken through a conduit in which the light source of the detection system is mounted showing the fiber optic cable relative to the light source in the transition zone wherein the multiplicity of reflections as shown in FIG. 8 are reduced.
Figure 10:
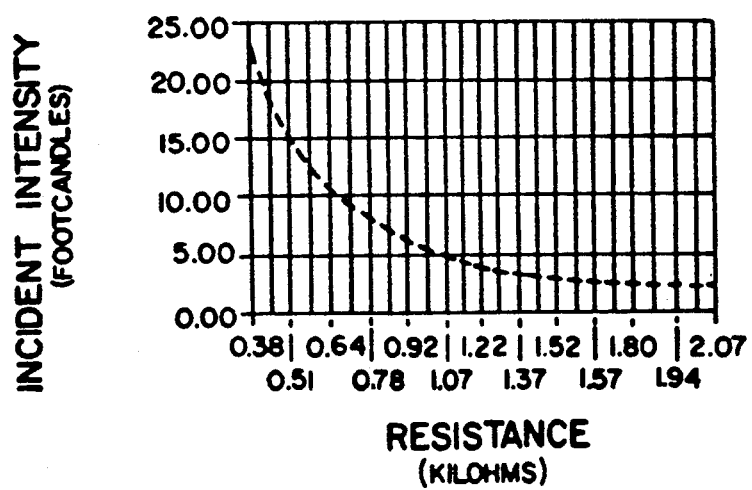
FIG. 10 is a graph of the photo conductor response showing incident intendancy verses resistance in the system.
Figure 11:
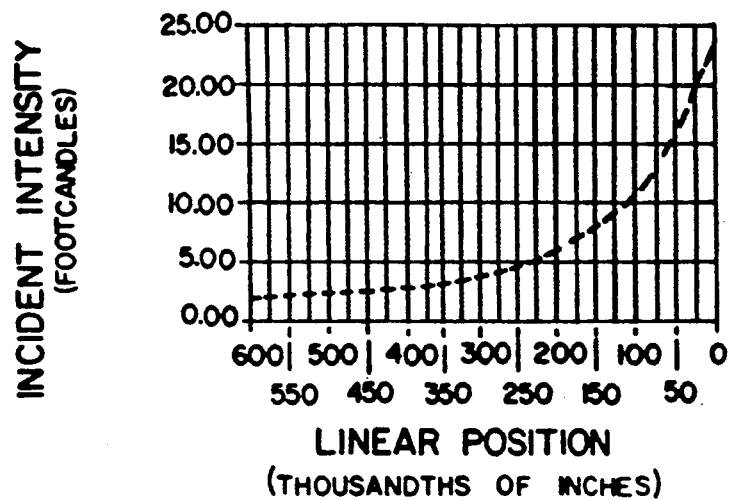
FIG. 11 is a graph showing the waveguide response of incident intendancy in relation to the linear position of the waveguide.
Figure 12:
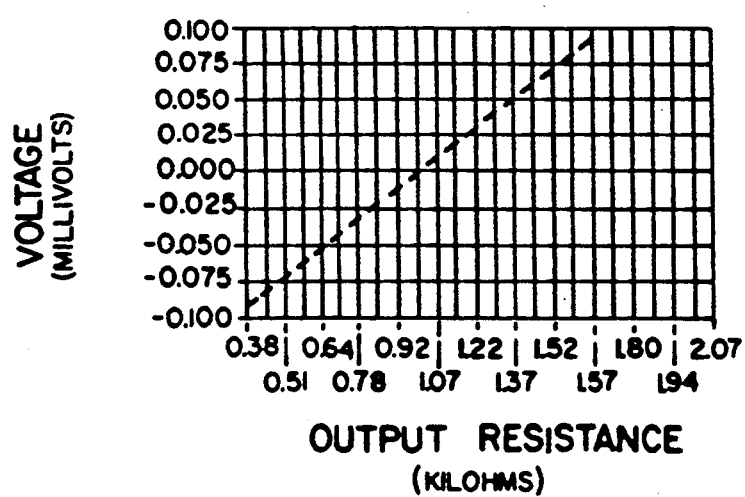
FIG. 12 is a graph of the voltage response showing the output voltage verses output resistance being a linear relationship in the system.

In another aspect, as seen with reference to FIG. 9, as the entrance end 80 of the fiber optic cable 78 is withdrawn from the light source 70 within the conduit 76, there is what may be termed a "transitional zone", T, wherein the primary luminance entering end 80 of the fiber optic cable 78 is due to direct radiation from the light source 70. As the tip of the fiber optic cable 78 withdraws further and through the transitional zone T, reflections from the walls of the conduit 76 increasingly contribute to the luminance entering end 80. Thus, as the entrance end 80 of the fiber optic cable 78 enters or exits the transitional zone T, the intensity of light entering the fiber optic cable 78 varies according to the presence or absence of reflections from the wave guide 76 in addition to the direct radiation. This problem is of concern with any waveguide irrespective of the geometric shape thereof and can result in a non-linear optical response from photodetector 88 as a function of displacement. To mitigate the transition from direct light only to direct plus reflected light or vice versa on the transition zone, there are several methods to produce highly linear, repeatable response characteristics. Relative to this, it has been found that the optical attenuating system will provide a linear output response only if the decay in radiation as the attenuator extends into or out of the transition zone corresponds to the optical response characteristics of the photosensitive detector. As an example, the optical response characteristic for a typical photoconductor is shown in FIG. 10 which will correspondingly require the optical response of the waveguide 76 to be mirror image of the photoresistor response as shown in FIG. 11. If the optical response from the waveguide is a mirror image, a linear output response from the photosensitive detector as a function of displacement will be achieved as seen in FIG. 12.

One way to overcome the difficulty with the optical characteristics of the waveguide in the transitional zone T is to control the output of the photosensitive detector by offsetting the entrance end 80 of the fiber optic cable 78 from the light source 70, which in effect eliminates the transitional zone T. Although this is an effective means to overcome the problems found in the transitional zone T, it adds to the overall length of the device and subtracts to some degree the total amount of movement which can be accurately and concisely detected by the system for a given working length. As an example, for a one-eighth inch diameter waveguide, the offset to overcome the transitional zone difficulties can range between 1/32 to 5/32 of an inch.

Alternatively, it has been found that the overall optical properties of the tube or waveguide 76 can be significantly enhanced by oxidizing the inner reflective surfaces thereof. The surface treatment is effective in correcting the reflective and optical inconsistencies imparted to the waveguide by the manufacturing process throughout the working length of the waveguide 76 as well as enhancing the optical characteristics within transitional zone T. As an example, with a brass tube or waveguide 76, it is desired to oxidize the inner reflective surface thereof so as to form very fine pits or disconformities in the surface on a microscopic scale. Having achieved this, reflections of light rays from the light source 70 are disbursed or diffused more uniformingly and the optical characteristics of the waveguide are greatly enhanced such that when the entrance end 80 of the fiber optic cable 78 enters or exits the transition zone T, the overall response of the photodetector 88 is linearized nearness of the fiber optic cable 78. The surface treatment of the waveguide 76 acts in such a way that the difficulties in the transitional region are reduced or eliminated. This in turn eliminates the need to offset the entrance end 80 of the fiber optic cable 78 from the light source 70 and extends its usefulness for a given working length.

As an example, using a brass waveguide 76, a solution of selenium dioxide, nitric acid and methyl alcohol which is commercially available as brass darkener has been found to oxidize the brass waveguide 76 effectively. It should also be recognized that brass is only one material which has been found to be usable with the present invention and other materials exhibiting proper optical characteristics can be utilized. For example, copper waveguides may be utilized wherein the copper inner surface of the waveguide would be oxidized by known methods or anodized aluminum or blued steel may be sufficient. Similarly, some plastic materials could be formed in the desired cross-sectional shape and the inner reflective surfaces thereof treated by chemical or mechanical means so as to impart the desired optical characteristics to the system. In all these cases, the desired amount and type of oxidation or surface treatment will depend upon the particular material being utilized so little or no offset is necessary. The surface treatment process yields a waveguide having better optical characteristics such that the system performance is upgraded, and allows shorter lengths of waveguides to be utilized. The materials and surface treatment provide an easy and inexpensive way to obtain the desired optical characteristics for proper functioning even in the transition zone, and the treatment methods are conducive to mass manufacturing in a repeatable and reliable fashion. It has also been found that the surface treatment is advantageous in that controlled oxidation or surface treatment of the inner surface of the waveguide will minimize or eliminate uncontrolled oxidation which may occur over time with some metals that could have a variable effect in the response characteristics of the system.

It can be seen from reference to FIG. 4, that with the entrance end 80 and conduit portion 84 inserted into the end of the conduit 76 which may have any desired length, the radiation emitted from the LED 70 will travel to the fiber optic cable 78 through the air gap formed within the conduit 76. As the fiber optic cable 78 slides relative to the conduit 76, the length of the air gap will accordingly decrease or increase. As the distance increases from the LED 70, the intensity of light which reaches and is transmitted through the length of the fiber optic cable 78 is reduced. Normally, the attenuation of the radiation from the light source to the fiber optic cable will vary as a function of the square of the distance therebetween. In the optical attenuator of the present invention, the reflections created in the conduit 76 act to compensate for this change of radiation over distance to some degree so as to maintain the amount of light which reaches the fiber optic cable, and to thereby yield and an effective measurement system. This aspect of the invention will be described in more detail hereinafter.

Figure 5A:
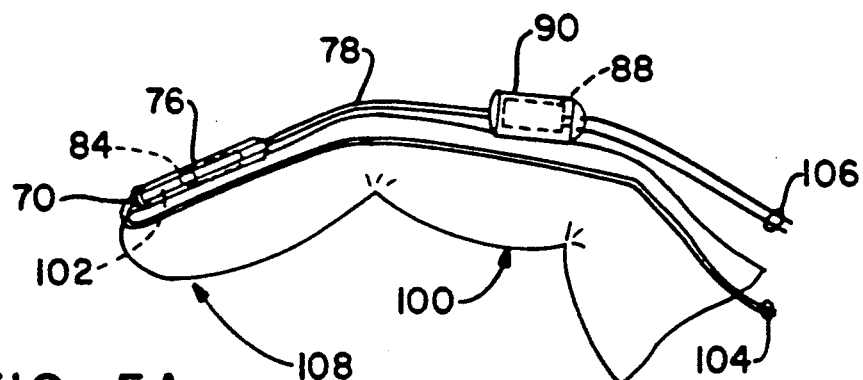
FIGS. 5a and 5b show the operation of the movement detection system in association with relative movement of a finger to which the system is attached.
Figure 5B:
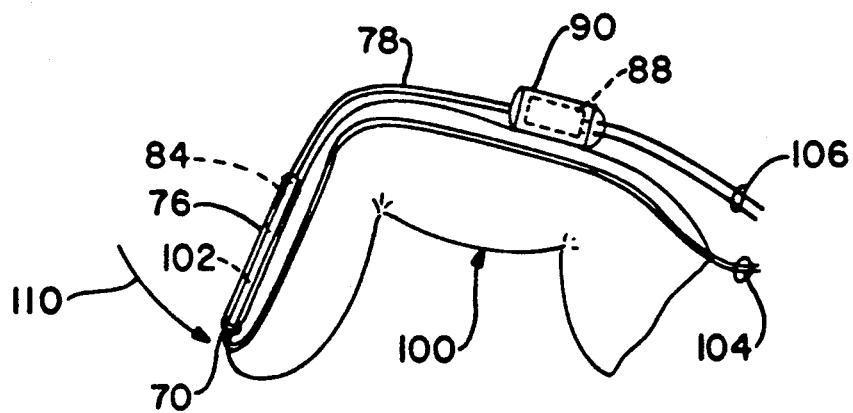

At the exit end 82 of the fiber optic cable 78 there may also be positioned a conduit portion 86 for rigidity of the system which may not be necessary in some applications. The detecting means 88 is provided at the exit end 82 of the fiber optic cable 78 so as to capture the radiation propagated therethrough. The detecting means may be a photoresistor as shown in FIG. 4 or any alternative light detecting means which are conventionally available and known in the art. The detecting means 88 will transform the detected radiation levels into electrical signals which are processed by an optical control system for use. Another length of conduit 90 may be provided to house the detecting means 88 to form a rigid and durable construction. The light detecting means 88 may be sealed within the housing 90 to prevent external light from entering the detection system. Circuitry 92 is provided to process the signals received from the detecting means 88, and may comprise a resistor network consisting of two potentiometers to adjust the ramp and offset of resistive output from a photo resistor as a function of movement in one example. As seen in FIGS. 5a and 5b a functioning of the optical attenuator is shown as used to measure movement of a finger of an operator. In FIG. 5a, the LED source 70 and length of conduit 76 are positioned at the tip of the finger 100 and secured thereto. The length of fiber optic cable 78 is positioned such that the conduit portion 84 extends inside the conduit 76 to a position relative to the LED 70. An air gap 102 is thereby formed between the entrance end of the fiber optic cable 78 and the LED 70. At the exit end of the fiber optic cable 78 is positioned the light detecting means 88 within housing 90. The LED 70 is coupled by means of wires 104 to the power source and the light detecting means 88 will transmit information to the processing means by wires 106.

It should be recognized that as the finger 100 of the operator moves to a straightened position as shown by arrow 108, the air gap 102 will be shortened and the attenuation of light signals transmitted from the LED 70 will decrease. Alternatively, as seen in FIG. 5b, as the finger 100 of the operator is moved in a direction as shown by arrow 110, the air gap 102 will increase and the light emitted by the LED 70 will be attenuated to a greater extent. In this way, movement around a subtended arc formed at the joint of the finger 100 over which the detection system is placed is effectively measured. The change in distance between the LED 70 and the entrance end of the fiber optic cable 78, as the cable and conduit portion 84 slide within the conduit 76 during movement yield signals proportional thereto. It is this phenomenon which enables accurate measurements of finger movement which may then be translated into mimicked movement of a robotic hand or the like. As mentioned previously, the detection system may be placed so as to measure movement around any joint or other area of the hand or other body portion. Similarly, the detection system may measure linear movement on a straight line portion or may be positioned in a manner to measure rotational movement such as relative rotation between the hand and forearm about the wrist. It should also be recognized that the utilization on a human operator is only one application for the detection system, and a wide variety of other uses are envisioned. In effect, the movement detection system of the invention may be used to measure the position (distance or subtended arc) of one point to another on a flat, curved or irregular surface, or to measure the relative position of one part of a human body to another to form active measurement systems which may be used to control intelligent machines, robots or the like in real-time. Alternatively, the measurement system may be used as a position controlling device or position measuring device to measure relative movement on any type of assembly to yield feedback or quantifiable verification of movement.

In one example of the optical attenuator movement detection system, the light source 70 as shown in FIG. 4 may be a conventional LED with a diffused lens transmitting light at a wavelength of 660 nm. Light emitted from the LED and conveyed through the air gap to the fiber optic cable 78 is then propagated to the light detecting means 88 which may be a cadmium selenium photoresistor closely matched to the wavelength of the LED. Optic cable 78 should have a diameter to capture a sufficient amount of light to maintain signal strength and to provide rigidity to the system.

Although this particular configuration yields accurate and repeatable results, it is recognized that a wide variety of light source/detector pairs may be utilized with the concept of the invention. For example, LED's having different wavelengths, incandescent lamps, or lasers could be used to form the movement detection system. It is also recognized that the type of light detecting means can similarly vary over a wide range such that any light detecting device sensitive to the wavelength of the emitting source and which is physically constructed such that the light transmitted through the fiber optic cable can be directed on it. For example, cadmium sulfide or other photoresistive cells may be selected with various electrical characteristics, and the response parameters coupled to an appropriate interface circuit. Similarly, a phototransistor or other photosensitive device with appropriate circuitry may be used to provide voltage or current output response as a function of position. It should be recognized that a pulsed light input may be provided to generate a position controlled amplitude modulated sampling train which may be useful for digital systems.

With alternative light source/detecting means the electrical interface circuitry will vary accordingly to produce desired output signals as a function of motion. For example, with photoconductive cells, there may be provided resistive networks, bridge circuits, or control circuits of an amplifier or other electronic interface circuitry as desired. Similarly, with phototransistors, the control circuit may include semi-conductors or other electronic devices to provide the appropriate response as a function of a position. Thus, the entire system may generate signals as a change of resistance for analog control as with the LED/photoresistor pair, or alternatively may generate current or voltage signals proportional to movement which may be then digitized to drive computer or other appropriate electronic control circuitry. By digitizing voltage or current signals, the system may then include complex processing means to transform or shape the output as desired. For example, the abduction/adduction sensors used on an operators hand may pick up flexion motion also. To compensate for this, the flexion and abduction/adduction signals could be input into a wheatstone bridge circuits and fed to differential amplifiers where the flexion signals can be subtracted out at a summing amplifier to yield signals proportional to the abduction/adduction movement only which can then be digitized if desired. In this way, more complex user systems may then be handled in real-time to measure 3-D motion.

Figure 13:
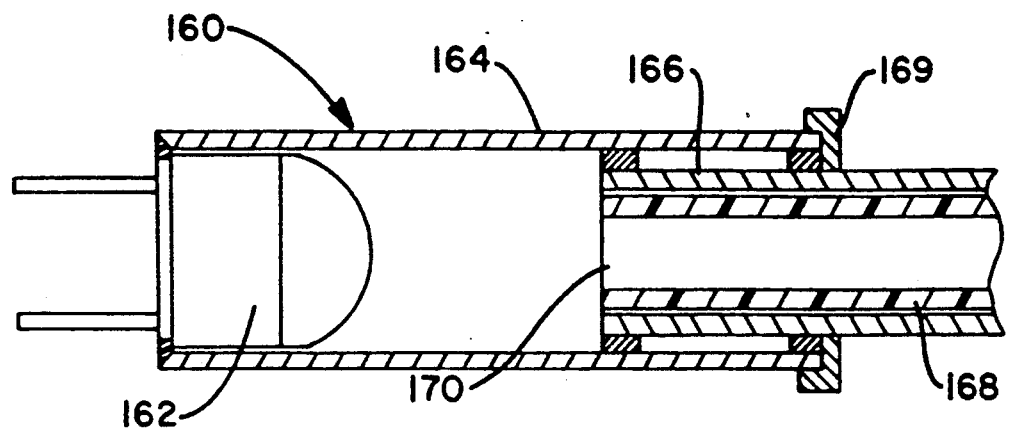
FIG. 13 shows an alternate embodiment in an enlarged section view taken through the conduit in which the light source of the detection system is mounted wherein the waveguide is rigidly mounted within the conduit for abduction/adduction measurement for example.

In an alternate embodiment as shown in FIG. 13, abduction/adduction movement can be sensed by a sensing device 160 which comprises a light source 162 which may again be an incandescent source, LED or other suitable source having a predetermined wavelength of emitted light. The light source 162 is driven by a voltage source in a similar manner to that shown in FIG. 4. Also, the voltage to the light source 162 may be similarly adjusted by a potentiometer to emit the desired intensity of light. The light source 162 is positioned to emit light into a length of tubing or conduit 164 which again is preferably hexagonal in cross section or of other various cross-sectional configurations. The light source 162 is appropriately sealed at the end of the conduit 164 so to prevent external light from entering the system at this location. At the opposed end of tube 164 from light source 162, is provided another tube 166 having a similar hexagonal cross section as tube 164. Tube 166 is of smaller cross sectional dimensions so as to slidably fit snugly within tube 164. Inside the length of rigid tube 166 is positioned a length of fiber optic cable 168 having an entrance end 170 all of which are positioned within tube 164. The fiber optic cable 168 will transmit captured radiation directed from the light source 162 within outer tubing member 164. The inner tube 166 is designed to provide for linear movement along the expected path of travel so as to detect the desired movement of the body to which it is attached. The length of tube 166 is such that the entire length of travel is accommodated thereby. In this manner the entire optical attenuation system is rigidified. At the opposed end of tube 164 from light source 62 can be provided an end cap 169 having an aperture to accommodate tube 166 so as to further rigidify the system.

Figure 14:
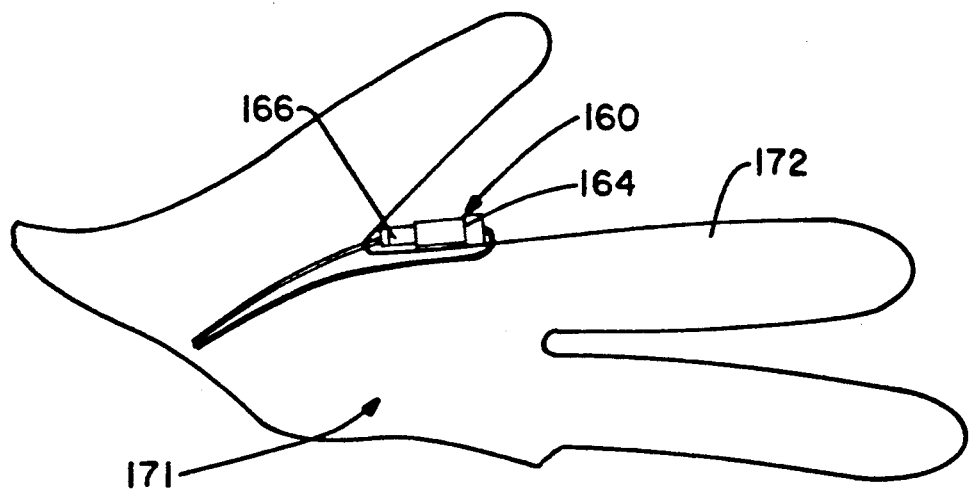
FIG. 14 shows the position of the device as shown in FIG. 13 on the hand of a Wearer to measure abduction/adduction movements.

Being of a rigid construction, this embodiment is especially suitable for measuring abduction/adduction movements wherein tube member 164 including light source 162 may be positioned adjacent to the knuckle portion 171 of a finger 172 or other body member for which abduction/adduction movements are to be detected as seen in FIG. 14. The opposed end of tube member 166 which extends from tube 164 will also be secured to a portion of the body for which measurements are to be made such that the entire system forms a rigid construction which will only be affected by adduction/abduction movements and not by flexion motion. Thus, in such an embodiment, the necessity to subtract flexion signals which may be incorporated into abduction/adduction signals as previously described will be avoided. As seen in FIG. 14, the rigidified device for measuring abduction/adduction movements may be positioned adjacent the knuckle 171 of forefinger 172 or on the lateral side of the index finger approximately at the metacarpophalangeal joint or another similar location. At such a position, the flexion motion of the finger 172 is not translated to the device 160 so as to effectively measure abduction/adduction movement of the forefinger 172 without being adversely affected by flexion movement of the forefinger. In this embodiment, the travel associate with abduction/adduction is quite small relative to flexion movement and therefore the entire system may be shortened to account for the desired amount of movement to be detected. Also, because the system as shown in this embodiment has been rigidified, flexion movement will not impart any relative movement between light source and detector in device 160.

Figure 15:
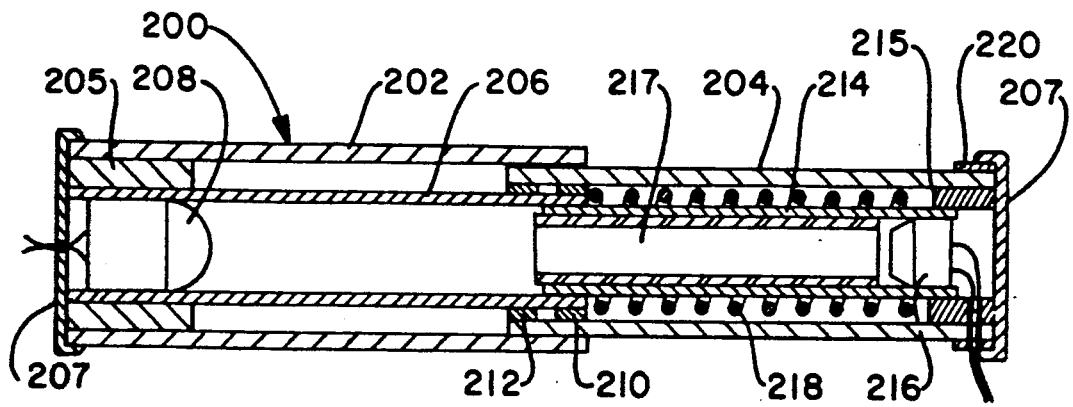
FIG. 15 shows an alternate embodiment of the invention in an enlarged sectional View taken through the conduit in which the light source and detector arrangement is mounted being a rigid spring biased construction.

In another alternate embodiment as shown in FIG. 15, an optical attenuation system designed to detect linear movement between two surfaces or portions of a body, machine or the like is shown. In this embodiment, the linear movement detection system 200 is entirely self-contained and encapsulated within an outer housing comprising a first conduit or tubular member 202 which may be of round or hexagonal cross-section. A second outer housing member 204 is dimensioned so as to be received in conduit 202 in a slidable fashion, and thus has a cross section of smaller dimension than member 202. Within outer housing conduit 202, is positioned another conduit portion 206 preferably of hexagonal cross section which acts as the optical waveguide for transmitted light from a light source such as an incandescent source, LED or other suitable source 208. The light source 208 is securely positioned within conduit portion 206 so as to direct transmitted light into the open region of conduit 206. The light source 208 is driven by a voltage source (not shown), which allows adjustment of the emitted light therefrom to the desired intensity as previously described. The light source 208 is sealed within tubular member 206 so as to prevent the ingress of any external light into the conduit 206. At the opposed end of conduit 206 from the light source 208, is positioned stop 210 which coacts with stop 212 formed in the conduit portion 204 to retain the assembly in a self-contained and secure position. The stops may be circular or hexagonal rings which contact each other around the housing members and also facilitate alignment and help prevent binding of the conduits.

It should be evident that conduit portion 204 is slidable relative to conduit portions 202 and 206 within the space therebetween. Conduit portions 202 and 206 are spaced apart the desired amount by a small section of conduit 205 or other spacer means which are securely sealed to conduits 202 and 206. The entire end of the assembly at the location of the light source 208 and light detector 216 can be sealed by caps 207 or in another appropriate manner for the particular environment in which the system is to be utilized. At the opposed end of system 200 from the light source 208 is another conduit portion 214 which is dimensioned so as to slidably engage conduit portion 206 on its inner dimension and is preferably hexagonal so as to maintain proper alignment. In the conduit portion 214 is positioned a length of fiber optic cable 217 which is rigidly secured therewith. As shown, the fiber optic cable may extend slightly out from conduit portion 214 so as to prevent contact between conduit 214 and light source 208. Although the fiber optic cable 217 is securely fixed in position, it is possible, when constructing device 200, to displace the exit end of the cable 217 from the photodetector 216 to effect slight tuning of the system as to its output response. For example, if the exit end of cable 217 is too close to the photodetector 216, which may be a photoresistor, a very high impedance output may be obtained which would effect the choice of circuit components of the optical control system. By displacing the end of the cable 217 relative to the photodetector 216, the output response can be varied to some degree to enable the output to be tuned and the optical control system to be designed with desired circuit components. Once such a tuning procedure is accomplished, the cable 217 can be secured in a fixed position such that the device 200 will provide a selfcontained device which is already tuned and ready for use. The light detecting means 216 is positioned at the opposed end of conduit portion 214 from the light source 208 relative to the fiber optic cable 217. The light detecting means 216 can be of any suitable type. The conduit portion 214 is securely held Within conduit portion 204 by means of spacers 215. Located in the region between conduit portion 204 and portion 214, is a spring or bias means 218 which may impart compression or extension forces to the system. The spring 218 acts on the portion of the system including conduits 204 and 214 relative to conduits 202 and 206 so as to maintain an initial biased relationship therebetween. Upon compression (or extension as the case may be) of conduit portion 204 into conduit portion 202, the spring will act to maintain an initial position once any external forces as applied thereto are relaxed. The optical attenuation system operates in essentially the same manner wherein the intensity of light reaching the detector 216 from the light source 208 will directly correspond to the linear distance between these elements. It should be recognized that this embodiment is especially advantageous for use in harsh environments where the self-contained form provides rigidity and strength to the system and the tuned system facilitates measurement of linear distance or movement between two objects with very high accuracy. Thus, this embodiment can be used in a variety of applications including calipering, vibrational measurement, distance, velocity or acceleration measurements, as well as a variety of other applications. The entire assembly 200 is enclosed to prevent the ingress of external light and may be sealed for the particular environment encountered.

Figure 6:
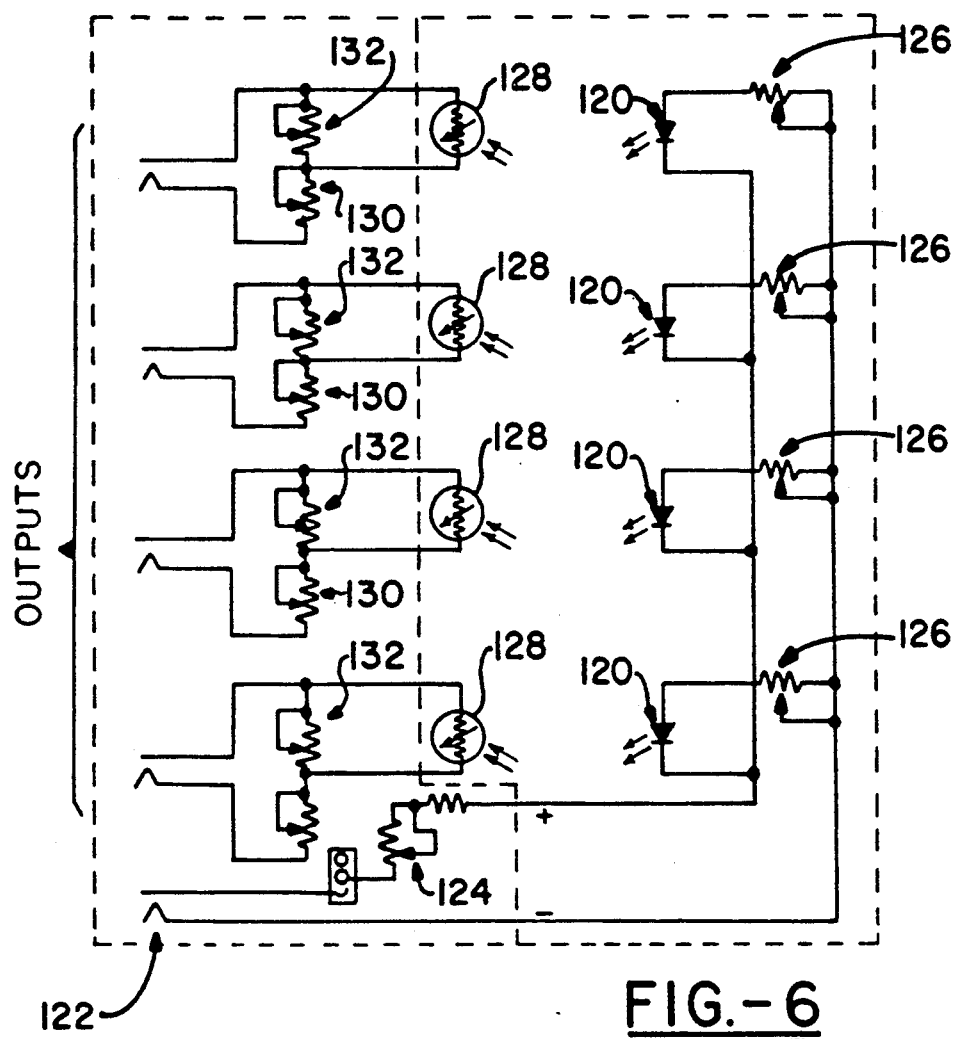
FIG. 6 is schematic circuit diagram of one type of optical control system which may be utilized with the detection system.

For the systems as described above, one example of interface circuitry which may be utilized is shown in FIG. 6 for the LED/photoresistor pair previously described. This system provides a very simple, low-cost package, but still yields accurate and repeatable results. The optical control system as shown in FIG. 6 for use with a system as shown in FIG. 2 comprises a plurality of LED light sources 120 such as gallium arsenide type LED's having a wavelength of 665 nm which are coupled to a power source at 122 having a control potentiometer 124. Each of the individual LED's 120 may include a fine adjustment potentiometer 126 associated therewith. A detecting means 128, which may be a cadmium selenium photoresistor, receives the emitted light from the LED's 120. The photoresistors 128 are coupled to control circuitry consisting of a resistor network of two potentiometers. The two potentiometers include one potentiometer wired in series at 130 which serves as an offset adjustment for the output. Another potentiometer 132 is wired in parallel and serves as a ramp adjustment for the output signals. The optical control circuitry will form resistive outputs as a function of movement for each of the joint movement of an operators hand, such as shown in FIG. 2.

Figure 7:
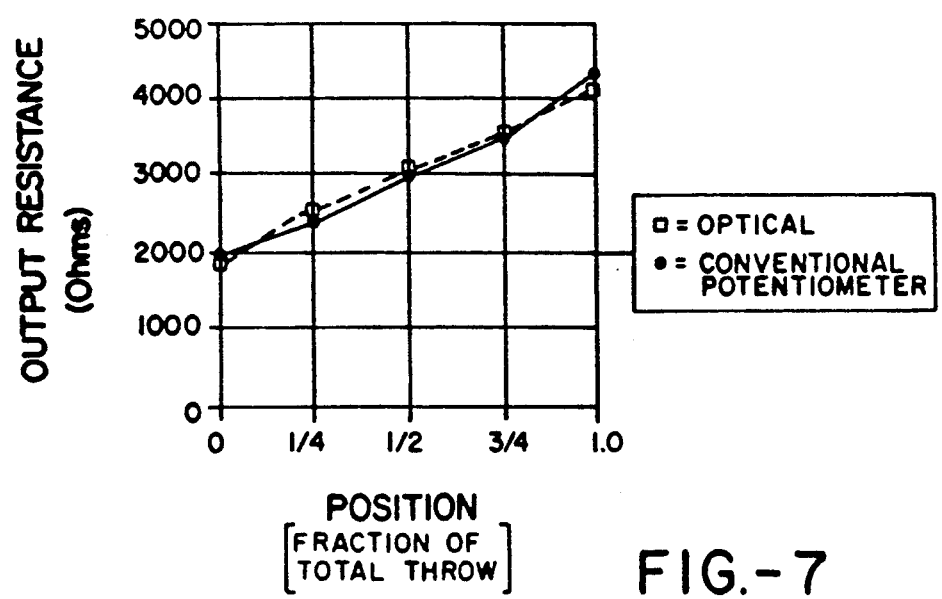
FIG. 7 is a graph showing the relationship of resistance verses position of the optical movement detection system relative to a conventional control potentiometer of a remote control transmitter.

The graph of FIG. 7 shows the output of an optical attenuator movement detection system as described with reference to FIG. 6 as a function of position. As shown in FIG. 7, the optical attenuator output is shown as compared to the output of a conventional potentiometer which may be used in a conventional RC transmitter. It is noted that the optical output is extremely linear over the entire range of position and may be effectively substituted into the RC transmitter for remote control of an intelligent machine, robot or the like.

Figure 8:
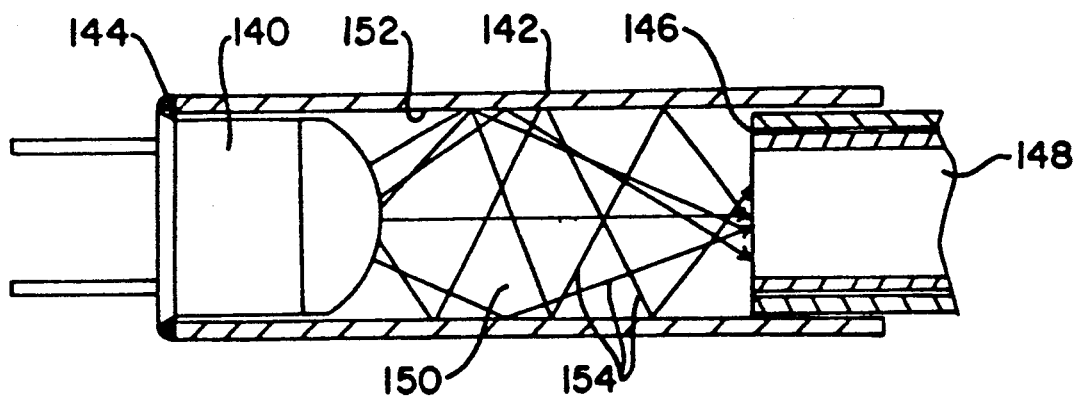
FIG. 8 is an enlarged sectional view taken through a conduit in which the light source of the detection system is mounted showing the effective scatter of the light signals of the light source as well as the multiplicity of reflections within the conduit leading to a linearized output.

Turning now to FIG. 8, an enlarged view of the light source in the transmitting unit of the invention is shown. A LED 140 is positioned inside a length of conduit 142 and may be sealed therewith by an opaque epoxy 144 or any other suitable means in such a way as to prevent external light from entering the conduit 142. The entrance end 146 of a length of fiber optic cable 148 is slidably disposed in the length of conduit 142 so as to form a gap 150 which simply may be air or another type of fluid. The fiber optic cable 148 slides relative to the conduit 142 to vary the distance between the LED 140 and the entrance end 146 of the cable. As mentioned previously, it may be desired to modify the natural attenuation of light reaching the entrance end of the fiber optic cable 148 from the LED 140 as the relative distance therebetween varies. The inside surface 152 of the conduit 142 may thus be a reflective surface to produce multiple reflections 154 of the emitted radiation from the LED 140 which are additive to the direct radiation falling on the entrance end 146 of the fiber optic cable 148, so as to linearize the subsequent output of the optical attenuator system. In effect, the amount of radiation falling on the entrance 146 of the fiber optic cable 148 emitted and diffused by the LED 140 is enhanced by the multiple reflections created by means of the reflective surface 152 of the conduit 142. Thus, when a diffused light source such as many conventional LED's, Fresnel lenses, incandescent lamps or the like are used as the light source, the output of the detection system will be extremely linear as seen in FIG. 7. In some situations, a less diffused light source may be desirable to give certain optical characteristics for control of the output. For example, with reference to FIG. 2, the sensing device 12 positioned at the outermost joint of the index finger has limited movement associated therewith. Under these circumstances, it is desired to provide greater output for small relative movement between the light source and the entrance end of the fiber optic cable. This may be accomplished by grinding the conventional LED to emit more of a point but still somewhat diffused source of radiation or by other enhancements. An alternative light source such as a laser may also be utilized in the system and may yield a linear output by the use of a diffusion grating or the like to gain the desired optical characteristics. It is also recognized that the output control system may include appropriate circuitry to shape a proper response.

In another aspect of the invention, the optical attenuation system and interface circuitry associated therewith is susceptible to adjustments to accommodate inherent response characteristics of the components utilized therein. As the optical attenuation system is designed to provide a highly linear output, the inexpensive, stable resistive circuits which may be utilized to produce a voltage or current response have been found to add non-linearities to the output response. The non-linearities introduced by the interface circuitry tend to defeat the highly linear response of the optical attenuation system thereby effecting its capabilities. Such a phenomena is particularly true of passive voltage dividers including the widely utilized Wheatstone bridge which is usable in the present invention. For many applications, the non-linearity may be ignored as its effect is small compared to the range of output from the system. Although this may be true of many applications, high precision measuring or use as an interactive real-time control system necessitates a highly linear response from the entire system.

Although there are many alternatives to produce the desired voltage response via correction circuitry, computer algorithms or other expensive and sophisticated means, these systems themselves introduce other undesirable effects including drift, offsets and thermal instability or require sophisticated computer software programs to curve-fit the non-linear response and artificially generate a linear output. Although computer programs are widely used for this purpose, they require expensive equipment and introduce undesirable time delays, especially in systems employing several measuring devices to drive a control system in real time.

The optical attenuation system of the present invention provides a unique aspect in that it can be mechanically and electrically tuned such that with proper selection of the interface circuitry such as resistive components in a voltage divider, a highly accurate, stable and extremely linear voltage response can be inexpensively achieved. In essence, the optical attenuation system can be mechanically and electrically tuned so as to impart a controlled non-linearity into the system to counteract non-linearities imposed by the resistive circuits or other circuit components of the interface circuitry so as to produce an overall response that is stable and highly linear.

Figure 16:
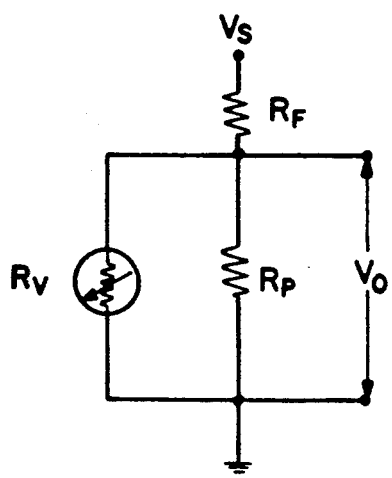
FIGS. 16-18 shows schematic representations of inner face circuit arrangements showing a voltage divider as it reduces in the system and a Wheatstone bridge respectively.
Figure 17:
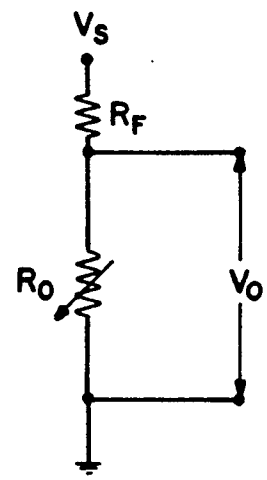
Figure 18:
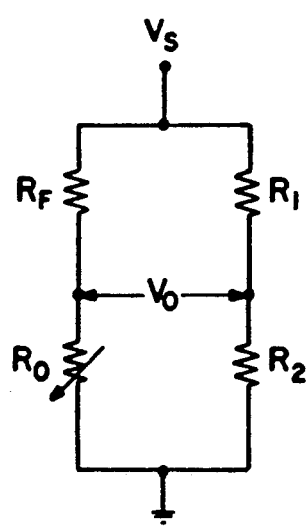

To recognize the imposition of a controlled non-linearity into the system, the response characteristics of the system will be briefly described. The transfer function relating output voltage, $V_O$, as a function of source voltage, $V_S$, for a typical voltage divider is $V_O = V_S R_O/(R_F + R_O)$, where $R_F$ is a fixed resistor and $R_O$ is the output resistance of parallel resistance $R_F$ and optical attenuator $R_V$ as shown in FIGS. 16 and 17. The typical voltage divider will have a non-zero output voltage wherein if a zero voltage output is desired for an initial position of the optical attenuation system, a second voltage divider can be added so as to cancel the initial voltage of the first voltage divider as seen in FIG. 18. This process is called nulling and in this configuration shows a basic Wheatstone bridge widely used in electrical measuring equipment. The transfer function for the Wheatstone bride is $V_O = V_S R_O/(-$ $R_O+R_F)-V_SR_1/(R_1+R_2)$ where $R_1$ and $R_2$ are fixed resistances.

Figure 19:
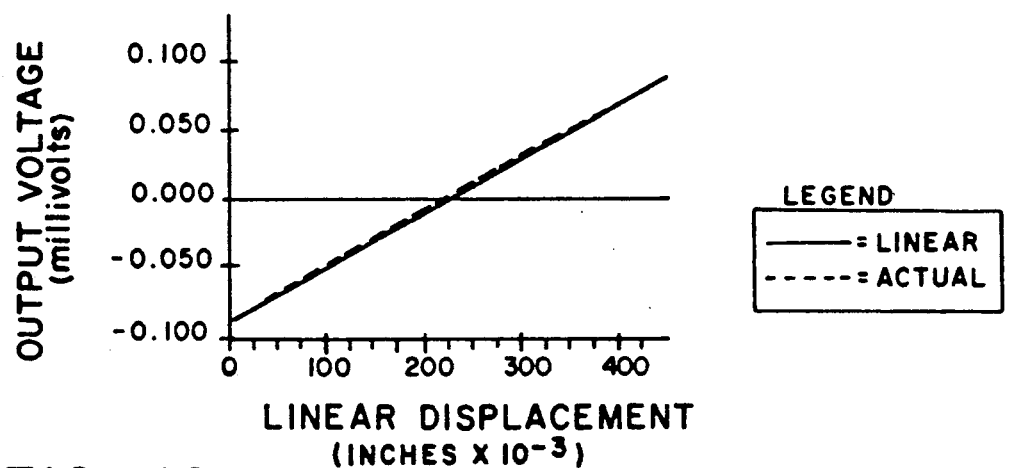
FIG. 19 is a graph showing the system transfer function of output voltage verses linear displacement showing the non-linearities introduced by the interface circuitry.
Figure 20:
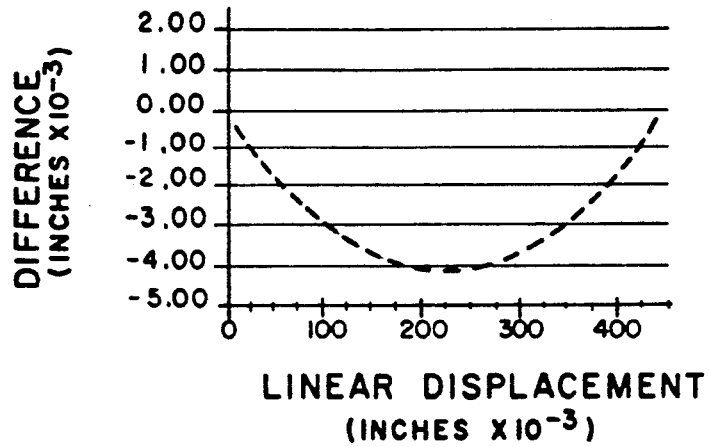
FIG. 20 is a graph showing the system error as associated with the graph of FIG. 19.
Figure 21:
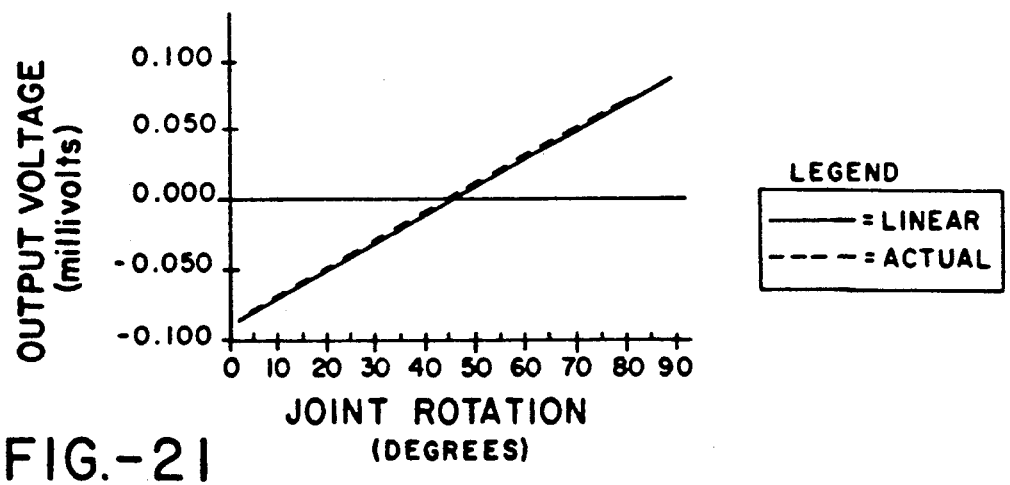
FIG. 21 is a graph showing the system transfer function for the system with output voltage verses joint rotation.
Figure 22:
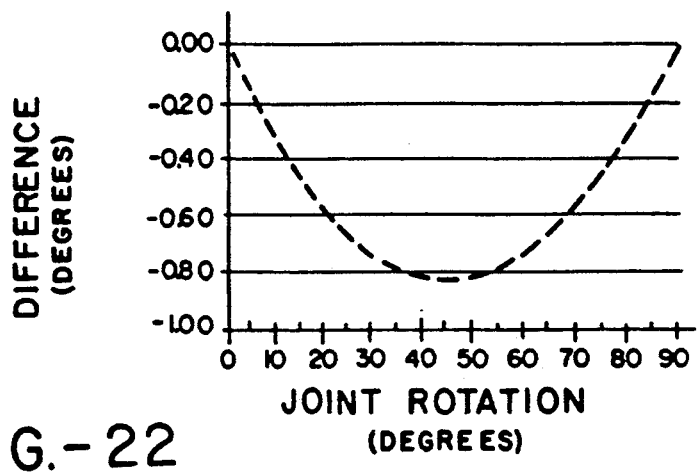
FIG. 22 is a graph showing a system error in the graph of FIG. 21.

Using a Wheatstone bridge construction with the optical attenuation system, which may itself use photoresistors as the light detecting means, creates inherent non-linearities in the system. A photoresistor is designed to exhibit a very linear output resistance response with respect to position, but the non-linearity introduced by the resistive voltage divider network when used with a perfectly linear optical attenuator has been found to correspond to about four thousandths of an inch for linear movement or about 0.8° for rotational measurements such as finger joints. As seen in FIGS. 19 and 21, the system transfer function shows the non-linear voltage response for a perfectly linear attenuation system using the voltage divider network for both linear attenuators and rotational attenuators. The error introduced into the system as shown in FIGS. 19 and 21 are depicted in quantified form in FIGS. 20 and 22 as a function of displacement for the linear optical attenuator and rotational optical attenuator respectively. The error introduced is due to the variable output resistance of the signal producing device, $R_O$, which appears in both the numerator and denominator of the transfer equation of a typical Wheatstone bridge. Thus, the greater the output variance of the signal producing device with respect to the fixed resistor of the voltage divider, the larger the induced non-linearity and error in the system. As the optical attenuation system of the present invention can have a large output variance, such effects clearly impact the resolution and function of the device. Although this error may be significant, tuning of the optical attenuation system with proper selection of voltage divider components results in highly accurate and stable voltage response characteristics and an inexpensive, repeatable system.

Tuning of the optical attenuator can be performed by selectively tuning the output response of the attenuator along with selecting proper resistive components for the voltage divider, whereby a nonlinearity can be intentionally introduced to cancel the non-linearity introduced by the voltage divider configuration. Mechanical tuning of the optical attenuation system can be performed by surface treatment of the reflective characteristics of the waveguide in which the light source is positioned, to achieve the desired optical characteristics.

Figure 23:
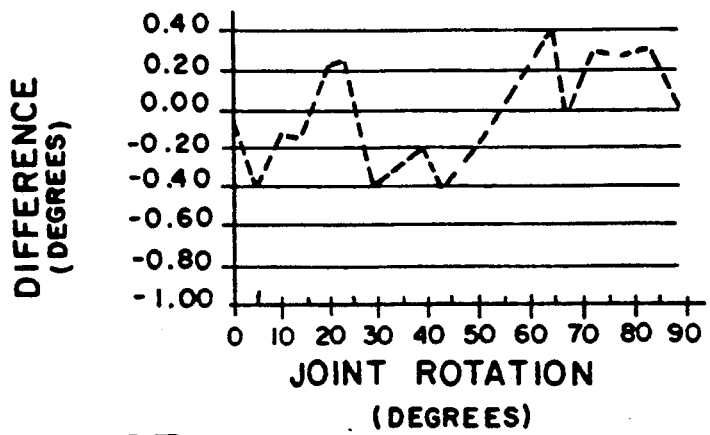
FIGS. 23 and 24 show graphs of the system error for linear and rotational displacement with a control non-linearity introduced into the system to account for non-linearities inherent in the interface electronic circuitry.
Figure 24:
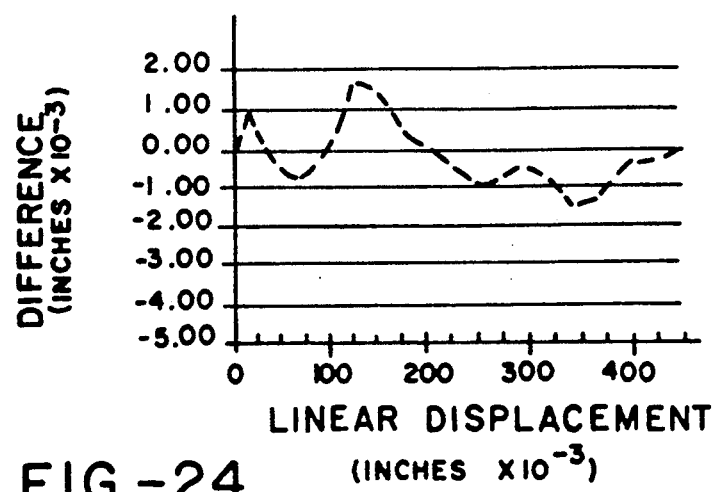

Alternatively, as the particular non-linearity to be canceled may vary, other tuning techniques are preferred. In one method, the offset between the entrance end of the fiber optic waveguide or photodetector and the light source in the optical attenuation system can be adjusted so as to introduce a desired offset which avoids some of the non-linearities imposed by the system. Although mechanical offset of the fiber optic cable or detector and light source is easily achievable, it does impact on the size and dimensions of the final optical attenuation system. Additionally, as previously described, it may adversely impact the total measurement capabilities thereof. Alternatively, the intensity of the light source can be modified to introduce a canceling non-linearity into the output response of the optical attenuation system. The intensity of the light source can be modified by adjustment of the voltage supplied thereto or by other techniques. The corresponding selection of the resistive components in the voltage divider network, the source voltage and output voltage span of the voltage divider, along with the adjustments made in the intensity of light used in the optical attenuation system provide a unique set of conditions that result in a highly linear output response as desired with typical system error responses improved as shown in FIGS. 23 and 24 for the linear attenuator and rotational attenuator respectively. It should be recognized that component selection for the particular optical attenuation system is easily achieved by a computer algorithm depending upon the output response of the voltage divider network and optical attenuation system. It should also be recognized that the voltage offset leg including resistors $R_1$ and $R_2$ of a Wheatstone bridge configuration as shown in FIG. 18 does not introduce non-linearities since the resistive components are fixed, and consequently these components are not used in the tuning procedure. The optical attenuation system along with interface circuitry as described provide a highly linear and stable configuration which is inexpensive and conducive to mass production.

Turning now to FIG. 25, there is shown an alternate embodiment of the optical attenuator of the invention generally designated 300 wherein the light emitting and light detecting means are positioned at a remote location from the device 300 to allow various advantages and applications. The device 300 comprises an outer conduit housing 302 in which is positioned a first fiber optic cable 304 which is fixed in position at one end of the conduit 302. The fiber optic cable 304 includes optical waveguide 306 surrounded by a sheath 308 in a known manner so as to convey light therethrough. The fiber optic cable 304 is rigidly positioned within the conduit 302 by means of a rigid guide 310 which can be secured within the conduit 302 by epoxy or other suitable means. The fiber optic cable 304 essentially has its exit end 312 positioned within the conduit 302 with its opposed end or entrance end (not shown) remote from the device 300 and coupled to a suitable source of light. At the exit end 312 of the fiber optic cable 304 may be positioned a lens 314 of predetermined type. A suitable light source positioned at a remote location from the device 300 will convey light to the entrance end of the fiber optic cable 304 which will be transmitted to the exit end 312 and through lens 314 such that the exit end 312 in conjunction with the lens 314 will functionally act as a source of light for the device 300. The remote light source could be an incandescent lamp, LED, laser or other suitable source with its luminance routed to the optical attenuator by the fiber optic cable 304. The lens 314 is preferably a divergence lens which will defuse the light transmitted thereto by means of the fiber optic cable 304. Other types of lens may of course be utilized for various applications to generate the desired optical characteristics in the device 300. At the opposed end of the conduit 302 is positioned another fiber optic cable 316 comprising waveguide 318 surrounded by a sheath 320. The fiber optic cable 316 is positioned within the conduit 302 by means of a rigid guide member 322 which is movably positioned within the conduit 302 at an opposed end thereof from fiber optic cable 304. As in previous embodiments, the conduit 302 may be of hexagonal cross-section wherein the rigid guide members 310 and 322 will also be of hexagonal cross section of slightly smaller dimensions so as to fit in conduit 302. The slidable motion of guide member 322 within the conduit 302 is thereby axially and rotatably positively aligned to facilitate calibration and function of the device 300. The fiber optic cable 316 has an entrance end 324 disposed within the conduit 302 in relation to the exit end 312 and lens 314 of fiber optic cable 304. The fiber optic cable 316 with guide member 322 is movable as shown by arrow 326 in relation to the exit end 312 of fiber optic cable 304 and acts as the light receiving means in the device 300. At the opposed end or exit end (not shown) of the fiber optic cable 316 is positioned a light detecting means at a remote location from the device 300. It should be recognized that light emitted into the fiber optic cable 304 will be conveyed to the exit end 312 and through the lens 314 so as to be emitted into the space between fiber optic cables 304 and 316 within the conduit member 302. The relative distance between the exit end 312 and lens 314 of fiber optic cable 304 and the entrance end 324 of fiber optic cable 316 and any change therein will thus determine the amount of light which will be conveyed through fiber optic cable 316 to a light detecting means. This in turn will provide an electrical signal similar to that previously described.

It should be recognized that this assembly overcomes certain inherent disadvantages which have been found to be associated with various light sources which may be used. In particular, the heat generated by an incandescent lamp can be troublesome in enclosed systems as heat can be an unwanted influence on electronic components and mechanical tolerances. The system as shown in FIG. 25 may use an incandescent light source which is located at a remote position so as to better control these influences. Additionally, variations in the physical structure of the filament in an incandescent lamp may effect the overall response of the optical attenuator. This is minimized when interfacing the luminance of the optical attenuator by a fiber optic cable like 304 since the filament spacial variations are not carried through the fiber optic cable. The system may use varying lengths of fiber optic cable which is then completely enclosed at its exit end within the optical attenuator 300. This same principle applies to LED sources as well as other sources where slight variations in the physical characteristics of the source itself may tend to cause variation in the overall response of the optical attenuator. For example, LED sources tend to drift over an extended time and are highly temperature dependent. By locating the LED source remote from the optical attenuator 300, this allows taping of the fiber optic source in a feedback type system enabling the monitoring of luminance and control thereof so as to maintain a constant and uniform level.

Another distinct advantage of the optical attenuator 300 as seen in FIG. 25 is that using fiber optics to deliver luminance from a remote light source allows one light source to be used for several optical attenuators to provide consistency and reduce the cost of such a system.

Also, in the embodiment of FIG. 25, the exit end 312 of the fiber optic cable 304 which acts as the light emitting means in the system can be enhanced to provide various photometric properties to optically tune the system to a desired overall response. For instance, a square cut, polished end will photometrically approach a point source whereas a roughened end will produce defused light. Thus, the lens 314 which has been shown, may only be the end of the fiber optic cable 304 which has been treated to provide the desired photometric properties. Also, the fiber optic cable 304 can be readily terminated to a lens configuration 304 providing prescribed optical characteristics which result in desired responses of the optical attenuator 300.

Turning now to FIG. 26, there is shown another embodiment of the invention providing an optical potentiometer employing the characteristics of the optical attenuator with reference to other embodiments of the invention. While the embodiments as described herein mainly relate to measuring distances between a light source and light detector or their functional equivalents, the device also can be used as a manually controlled attenuator. The optical potentiometer generally designated as 350 includes an outer rigid housing or case 352 having an elongated aperture 354 formed therein about the center of conduit 352. Slidably disposed within the outer conduit 352 is a movable waveguide or conduit 356. The waveguide 356 houses a light source 358 of any suitable type at a fixed position relative thereto and disposed therein through an aperture 360 formed at a central location thereof. The movable waveguide 356 is slidable within the outer housing 352 as shown by arrow 362 over a limited predetermined distance. A light barrier 364 is utilized in conjunction with the light source 358 such that light emitted from the light source 358 is disbursed in opposed directions from the central location of light source 358. The light barrier 364 thereby prevents co-mingling of the light emitted into the opposed portions of the waveguide 358 from the central location of the light source 358.

Also, in this embodiment there is disposed within the outer rigid housing 352 are first and second rigid inner conduit portions 366 and 368 which are secured in spaced apart relation from the outer housing 352 by means of spacers 370. The inner rigid conduits 366 and 368 have cross-sectional dimensions so as to be disposed within the movable waveguide 356 in the opposed ends thereof from the central position of the light source 358. Within the inner conduits 366 and 368 are provided first and second lengths of fiber optic cable 372 and 374 having sheaths 373 and 375 respectively. The lengths of fiber optic cable 372 and 374 are rigidly positioned within the inner conduits 366 and 368 at opposed ends of the outer housing 352 relative to the central location thereof and to the location of the light source 358. The entrance ends 376 and 378 of the fiber optic cables 372 and 374 are thereby positioned relative to the location of the light source 358 which is movable in relation thereto. At the exit ends of the fiber optic cables 372 and 374 are provided light detecting means 380 and 382 respectively which may be photodetectors or other suitable light detecting means. It should be recognized that slidable movement of the movable waveguide 356 which carries the light source 358 will change the position of the light source 358 with respect to the entrance ends 376 and 378 of the fiber optic cables 372 and 374. In this way, the light entering the entrance ends 376 and 378 will vary depending upon the position of the light source 358 relative thereto. The light entering the entrance ends 376 and 378 is thereafter transmitted through the fiber optic cables 372 and 374 to the light detecting means 380 and 382 to provide electrical signals representative thereof. The location of the movable waveguide and therefore of the light source 358 is manually or automatically positionable to vary the location of the light source 358 with respect to the entrance ends 376 and 378 of the fiber optic cables 372 and 374.

It should be recognized that as the location of the light source is changed, the relative intensity of light entering the entrance ends 376 and 378 such that the electrical signals generated by the light detecting means 380 and 382 will vary correspondingly. In this way, the device 350 acts as a potentiometer with the relative location of the light source 358 dictating the output responses of the photodetectors 380 and 382 and the electrical signals generated thereby. In this embodiment, the device 350 will produce the same results as a conventional resistive potentiometer but would be controlled by adjusting the relationship of the light source 358 to the fiber optic cables 372 and 378 and thereby the light detecting means 380 and 382. By constructing a potentiometer in this fashion, significant advantages are obtained such as long life, stability, no effect from electromagnetic or electrostatic radiation as well as providing an infinite selection of responses. The device also eliminates the problems with conventional resistive potentiometers such as contacts which may get dirty, high inertial loading and vibration problems associated therewith. It should also be recognized that the light source 358 can be any suitable source such as an incandescent lamp, LED or other suitable source or may be a fiber optic cable having a remote light emitting means connected thereto with its exit end disposed in the movable waveguide 356 to emit light therein.

The optical attenuator movement detection system of this invention thus provides a practical and effective optical arrangement to obtain accurate and repeatable measurements in a large variety of applications. The measurement system disclosed comprises a simple, cost effective device for active or passive measurement applications. Various modifications and improvements to the invention described herein are believed to be apparent to one skilled in the art, such as modification of the light source means, light detecting means or control circuitry as desired. Although the invention has been discussed in detail with respect to certain preferred embodiments, various modifications and additions may be made to the invention without departing form the spirit and scope of the invention as defined in the appended claims.

What is claimed is:

1. An optical detection system comprising:
    light emitting means positioned in a first conduit so as to emit light into said first conduit,
    light detecting means positioned in said first conduit adapted to receive light emitted into said first conduit by said light emitting means,
    wherein the relative longitudinal distance that said light emitted into said first conduit travels between said light emitting means and said light detecting means is varied within said conduit in proportion to a variable to be detected.

2. An optical detection system as in claim 1, further comprising:
    at least one light transmission means having first and second ends with said first end position in said first conduit to receive light emitted by said light emitting means,
    said light detecting means being movable within said first conduit relative to said second end of said light transmission means, wherein said movement of said light detecting means varies the distance said light travels within said first conduit, and
    said first conduit has an inner surface which has been treated so as to produce uniform reflections of light which will linearize the output of the system with variation of said relative longitudinal distance light travels within said first conduit upon movement of said light detecting means therein.

3. An optical detection system as in claim 2, wherein, said treatment constitutes forming disconformities on said inner surface which will uniformly diffuse the light incident upon said surface.

4. An optical detection system as in claim 3, wherein, said first conduit is made from a reflective metal material and said treatment of said inner reflective surface comprises oxidation of this surface.

5. An optical detection system as in claim 1, further comprising:
    a second conduit which is adapted to be slidably engaged in said first conduit and has said light detecting means associated therewith.

6. An optical detection system as in claim 5, wherein, said first and second conduits have a hexagonal cross-section with said second conduit being dimensioned to fit within said first conduit with close tolerance, wherein said hexagonal cross-section maintains relative linear and rotational alignment of said light detecting means relative to said light emitting means.

7. An optical detection system as in claim 5, wherein, said first conduit is secured to a system, the movement of which is to be measured,
    said second conduit is secured to said system at another location thereon such that movement of said system results in relative movement between said first and second conduits along with relative movement between said light emitting means and said light detecting means positioned within said first and second conduits respectively.

8. An optical detection system as in claim 7, wherein, said system is a finger of human operator, and said conduit is secured adjacent the knuckle of said finger at the rotational axis of said knuckle with said second conduit being secured at a point toward the wrist of said human operator so as to measure abduction/adduction movements of said finger.

9. An optical detection system as in claim 1, wherein, relative movement between said light emitting means and said light detecting means results in changing the length of a gap formed between said light detecting means and said light emitting means thereby varying the amount of light reaching said light detecting means from said light emitting means as a function of the variable to be measured.

10. An optical detection system as in claim 5 wherein, said second conduit has an extended length adapted to accommodate the entire length of travel of said light detecting means along with said second conduit so as to form a rigidified structure.

11. An optical detection system as in claim 1 further comprising:
    an outer housing means having first and second portions adapted to be slidably engaged with one another wherein said first portion houses said light emitting means and said second portion is associated with said light detecting means,
    bias means acting on said first and second portions of said outer housing member so as to maintain an initial biased position therebetween when no external forces are applied to said first or second portions of said outer housing member.

12. An optical detection system as in claim 1, wherein,
    said light emitting means is a length of fiber optic cable having first and second ends wherein a light source is positioned relative to said first end to emit light into said fiber optic cable and said second end is disposed within said first conduit so as to emit the light propagated therethrough into said first conduit.

13. An optical detection system as in claim 12, wherein,
said second end of said length of fiber optic cable is provided with a light conditioning means to provide desired optical characteristics to the light emitted from said second end of said length of fiber optic cable.

14. An optical detection system as in claim 1, wherein,
said detection system is mechanically tuned by introducing at least a predetermined offset between said light detecting means and said light emitting means positioned within said first conduit.

15. An optical detection system as in claim 1, wherein,
said detection system is tuned by varying the intensity of light emitted by said light emitting means to introduce a controlled non-linearity into the output response of said optical detection system.

16. An optical detection system as in claim 1, further comprising:
an optical control system for processing signals received from said light detecting means to develop control signals proportional to a variable to be measured, wherein said device is electrically tuned by varying the intensity of light emitted by said light emitting means so as to introduce the controlled nonlinearity into the output response to cancel any inherent non-linearity introduced by said light detecting means or said optical control system.

17. An optical detection system comprising:
a light emitting means,
a first conduit in which said light emitting means is positioned to emit light therein,
a second conduit adapted to be slidably received in said first conduit,
a light transmission means positioned in said second conduit so as to have a first end slidably positioned in said first conduit to receive light emitted by said light emitting means,
a light detecting means relative to a second end of said light transmission means to receive light propagated through said light transmission means,
wherein said second conduit has a minimum length to accommodate all slidable motion of said light transmission means within said first conduit so as to form a rigid system wherein the relative distance between said light emitting means and said first end of said light transmission means varies to yield an indication of a variable to be detected.

18. An optical detection system comprising:
a light emitting means positioned in a first conduit so as to emit light into said first conduit,
at least one light transmission means having first and second ends wherein at least said first end is positioned within said first conduit to receive light emitted by said light emitting means,
at least one light detecting means positioned relative to said second end of said at least one light transmission means adapted to receive light propagated through said light transmission means,
wherein the relative distance between said light emitting means and said first end of said light transmission means varies to yield an indication of the variable to be detected.

19. An optical detection system as in claim 18, further comprising:
first and second light transmission means having first and second ends respectively wherein said first ends are positioned within said first conduit on opposed sides of said light emitting means to receive light emitted by said light emitting means,
said light emitting means and said first ends being movableable relative to one another in said first conduit,
first and second light detecting means positioned relative to said second ends of said first and second light transmission means adapted to receive light propagated through said first and second light transmission means, wherein relative movement between said light emitting means and said first ends of said first and second light transmission means will vary the output response of said first and second light detecting means to form an optical potentiometer.

20. An optical detection system as in claim 19, wherein,
said first conduit having said light emitting means is slidable in an outer housing member wherein said first and second light transmission means are fixed relative to said outer housing member such that slidable movement of said first conduit will vary the relative position of said light emitting means to said first ends of said first and second light transmission means.

21. An optical detection system as in claim 18, wherein,
said light emitting means comprises a length of fiber optic cable having first and second ends wherein said first end is positioned relative to a light source such that light is emitted into said fiber optic cable and said second end disposed within said first conduit so as to emit the light propagated through said fiber optic cable into said first conduit.

22. An optical detection system as in claim 1, wherein,
said light detecting means is associated with at least one light transmission means having first and second ends with said first end movably positioned in said first conduit to receive light emitted by said light emitting means and said second end associated with said light detecting means.

* * * * *